United States Patent
Lee et al.

(10) Patent No.: US 10,264,639 B2
(45) Date of Patent: Apr. 16, 2019

(54) APPARATUS AND METHOD FOR CONTROLLING LIGHT

(71) Applicant: SAMSUNG ELECTRONICS CO., LTD., Suwon-si, Gyeonggi-do (KR)

(72) Inventors: Woon-Sik Lee, Seoul (KR); Vishnu Vinjam, Seoul (KR); Immadi Prudhvitej, Seoul (KR); Kwan-Woo Song, Yongin-si (KR); Dae-Eun Yi, Seoul (KR); Hye-Jung Cho, Anyang-si (KR); Jae-Hong Kim, Yongin-si (KR)

(73) Assignee: Samsung Electronics, Co., Ltd., Suwon-si, Gyeonggi-do (KR)

( * ) Notice: Subject to any disclaimer, the term of this patent is extended or adjusted under 35 U.S.C. 154(b) by 0 days.

(21) Appl. No.: 15/827,512

(22) Filed: Nov. 30, 2017

(65) Prior Publication Data

US 2018/0153012 A1 May 31, 2018

(30) Foreign Application Priority Data

Nov. 30, 2016 (KR) .................... 10-2016-0161879

(51) Int. Cl.
*H05B 33/08* (2006.01)
*H05B 37/02* (2006.01)
*F21V 23/00* (2015.01)

(52) U.S. Cl.
CPC ....... *H05B 33/0842* (2013.01); *F21V 23/003* (2013.01); *H05B 33/0806* (2013.01);
(Continued)

(58) Field of Classification Search
CPC ............ H05B 37/0272; H05B 37/0227; H05B 37/0218; H05B 37/0245; H05B 37/0254;
(Continued)

(56) References Cited

U.S. PATENT DOCUMENTS 7,710,271 B2  5/2010 Frumau
8,253,340 B2  8/2012 Paton et al.
(Continued)

FOREIGN PATENT DOCUMENTS

EP  2 392 194 A1  12/2011
JP  5403786  11/2013
(Continued)

OTHER PUBLICATIONS

International Search Report and Written Opinion dated Mar. 6, 2018 in counterpart International Patent Application No. PCT/KR2017/0013959.

*Primary Examiner* — Vibol Tan
(74) *Attorney, Agent, or Firm* — Nixon & Vanderhye P.C.

(57) ABSTRACT

An apparatus and method for performing lighting control are provided. An electronic device capable of light control includes a sensor unit including at least one sensor, configured to output a sensing signal based on the at least one sensor, a communication unit comprising communication circuitry configured to transmit, to a server, a request message including identification information and context information, to receive a response message from the server in response to the request message, and to transmit a light control command message to a light controller, a controller configured to generate the context information based on the sensing signal received from the sensor unit, and to generate the light control command message to satisfy a visual comfort condition based on light control zone information corresponding to the identification information and the context information, included in the response message, and a storage including a database for light control.

20 Claims, 27 Drawing Sheets

(52) U.S. Cl.
CPC ..... *H05B 33/0857* (2013.01); *H05B 37/0227* (2013.01); *H05B 37/0272* (2013.01)

(58) Field of Classification Search
CPC ............ H05B 33/0854; H05B 33/0872; H05B 37/02; H05B 33/0845; H05B 33/0842; H05B 33/0806; G05B 19/042; F24F 2120/10; Y02B 20/48; Y02B 20/46; F21V 23/003
See application file for complete search history.

(56) References Cited

U.S. PATENT DOCUMENTS

| | | | |
|---|---|---|---|
| 8,415,897 | B2 | 4/2013 | Choong et al. |
| 8,427,076 | B2 | 4/2013 | Bourquin et al. |
| 8,493,209 | B2 | 7/2013 | Mohan et al. |
| 8,558,466 | B2 | 10/2013 | Curasi et al. |
| 8,587,225 | B2 | 11/2013 | Ashar et al. |
| 8,754,960 | B2 | 6/2014 | Ashdown |
| 8,872,432 | B2 | 10/2014 | Kercso et al. |
| 8,957,603 | B2 | 2/2015 | Kim et al. |
| 9,497,819 | B2* | 11/2016 | Van De Sluis .... H05B 37/0227 |
| 9,600,983 | B1* | 3/2017 | Lydecker ................. G08B 5/36 |
| 9,756,706 | B2* | 9/2017 | Breuer ............... H05B 37/0272 |
| 9,900,092 | B2* | 2/2018 | De Bruijn ............ H04B 10/116 |
| 9,912,492 | B2* | 3/2018 | McCarthy, III ..... H04L 12/2825 |
| 9,964,630 | B2* | 5/2018 | Lydecker ................. G08B 5/36 |
| 2012/0293075 | A1 | 11/2012 | Engelen et al. |
| 2012/0326608 | A1 | 12/2012 | Mohan et al. |
| 2013/0120238 | A1 | 5/2013 | Spaulding et al. |
| 2013/0241420 | A1 | 9/2013 | Balázs et al. |
| 2013/0249410 | A1 | 9/2013 | Thompson |
| 2015/0022325 | A1 | 1/2015 | Talstra et al. |
| 2015/0237706 | A1* | 8/2015 | Ben-Moshe ....... H05B 37/0272 315/294 |
| 2015/0282282 | A1* | 10/2015 | Breuer ............... H05B 37/0272 315/152 |
| 2016/0029458 | A1* | 1/2016 | Liu ........................ H05B 33/08 700/32 |
| 2016/0061472 | A1 | 3/2016 | Lee et al. |
| 2016/0205746 | A1 | 7/2016 | Kumar et al. |
| 2017/0314803 | A1* | 11/2017 | Jacobson .................. F24F 11/30 |
| 2017/0315697 | A1* | 11/2017 | Jacobson .................. F24F 11/30 |

FOREIGN PATENT DOCUMENTS

| | | |
|---|---|---|
| JP | 2014-035931 A | 2/2014 |
| JP | 2014-167796 A | 9/2014 |
| KR | 20-0406529 Y1 | 1/2006 |
| KR | 10-1256098 B1 | 4/2013 |
| KR | 10-2014-0040187 A | 4/2014 |
| KR | 10-2015-0068052 A | 6/2015 |
| KR | 10-2015-0078532 A | 7/2015 |
| KR | 10-2015-0102262 A | 9/2015 |
| KR | 10-2015-0104552 A | 9/2015 |
| KR | 10-2016-0021576 A | 2/2016 |
| WO | 2010/086757 | 8/2010 |
| WO | 2012/104773 A1 | 8/2012 |
| WO | 2012/140545 A1 | 10/2012 |
| WO | 2012/137125 A2 | 11/2012 |
| WO | 2013/030748 A2 | 3/2013 |
| WO | 2013/046112 A1 | 4/2013 |
| WO | 2013/102881 A1 | 7/2013 |
| WO | 2015/095238 A1 | 6/2015 |
| WO | 2016-007244 | 1/2016 |
| WO | 2016-161020 | 10/2016 |

* cited by examiner

[ ] ABSENCE
[ ] GROUP ACTIVITY
[ ] NATURAL LIGHT

APPARATUS AND METHOD FOR CONTROLLING LIGHT

CROSS-REFERENCE TO RELATED APPLICATION

This application is based on and claims priority under 35 U.S.C. § 119 to a Korean patent application filed in the Korean Intellectual Property Office on Nov. 30, 2016 and assigned Serial No. 10-2016-0161879, the disclosure of which is incorporated by reference herein in its entirety.

TECHNICAL FIELD

The present disclosure relates generally to an apparatus and method for performing light control based on a light control zone.

BACKGROUND

The Internet is evolving from a human-oriented connection network in which human beings generate and consume information to the Internet of things (IoT) in which information is transmitted/received and processed between distributed elements such as things. The Internet of everything (IoE) technology is emerging, which combines the IoT with big data processing through connectivity to a cloud server or the like.

For IoT implementation, technologies such as sensing, wired/wireless communication, network infrastructure, service interfacing, and security are required. Recently, techniques including a sensor network for interconnection between things, machine to machine (M2M) communication, and machine type communication (MTC) have been studied.

An intelligent Internet Technology (IT) service of creating new values for human livings by collecting and analyzing data generated from interconnected things may be provided in an IoT environment. The IoT may find its applications in a wide range of fields including smart home, smart building, smart city, smart car or connected car, smart grid, health care, smart appliance, and state-of-the art medical service, through convergence between existing IT technologies and various industries.

In traditional light control, one or more lights selected by a user are controlled. This light control scheme has limitations in its effectiveness in efficiently selecting a light in consideration of visual comfort or energy saving for a user.

The above information is presented as background information only to assist with an understanding of the present disclosure.

SUMMARY

An example aspect of the present disclosure addresses at least the above-mentioned problems and/or disadvantages and provides at least the advantages described below. Accordingly, an example aspect of the present disclosure provides an apparatus and method for configuring a light control zone in consideration of the visual comfort of a user, and performing light control based on the configured light control zone.

Another example aspect of the present disclosure provides an apparatus and method for performing light control in consideration of a target illuminance for a surrounding region as well as a target illuminance for a central region, based on a lighting facility.

Another example aspect of the present disclosure provides an apparatus and method for controlling the illuminance of a specific light control zone, using a user terminal.

Another example aspect of the present disclosure provides an apparatus and method for configuring light control zones, each including a plurality of lights, and saving energy by controlling lights on a per-light control zone basis.

Another example aspect of the present disclosure provides a user terminal and method for controlling a light based on a user position in conjunction with a light control zone-based manager control schedule or supporting direct light control of a user.

Another example aspect of the present disclosure provides an apparatus and method for performing light control in a manner that ensures visual comfort on a per-individual basis in a single open space.

Another example aspect of the present disclosure provides an apparatus and method for configuring a light control zone based on position information and illuminance information, automatically controlling the illuminance of a light through position-based control in conjunction with a light control schedule, and controlling the illuminance of a light based on a user request by a user terminal.

Another example aspect of the present disclosure provides an apparatus and method for recognizing occurrence of an emergency through a user terminal, and performing light control for a light control zone to notify the recognized occurrence of the emergency.

In accordance with an example aspect of the present disclosure, a light control method in an electronic device is provided. The light control method includes: transmitting to a server a request message including identification information and context information, receiving from the server a response message including light control zone information corresponding to the identification information and the context information in response to the request message, and transmitting to a light controller a light control command message configured to satisfy a visual comfort condition based on the light control zone information included in the response message.

In accordance with another example aspect of the present disclosure, an electronic device capable of light control is provided. The electronic device includes: a sensor unit including at least one sensor, configured to output a sensing signal based on the at least one sensor, a communication unit comprising communication circuitry configured to transmit, to a server, a request message including identification information and context information, to receive a response message from the server in response to the request message, and to transmit a light control command message to a light controller, a controller configured to generate the context information based on the sensing signal received from the sensor unit, and to configure (generate) the light control command message to satisfy a visual comfort condition based on light control zone information corresponding to the identification information and the context information included in the response message, and a storage including a database for light control.

In accordance with another example aspect of the present disclosure, a server capable of light control is provided. The server includes a communication unit comprising communication circuitry configured to receive a request message including identification information and context information from an electronic device, and to transmit a light control command message to a light controller, a controller configured to generate light control zone information defining a light control zone to satisfy a visual comfort condition corresponding to the identification information and the context information included in the request message, and to configure (generate) the light control command message using the generated light control zone information, and a storage including a database for light control.

In accordance with another example aspect of the present disclosure, a light control method of a server is provided. The method includes receiving a first request message including identification information and context information from an electronic device, generating first light control zone information defining a first light control zone to satisfy a visual comfort condition corresponding to the identification information and the context information included in the first request message, and transmitting to a light controller a first light control command message configured using the generated first light control zone information.

Other aspects, advantages, and salient features of the disclosure will become apparent to those skilled in the art from the following detailed description, which, taken in conjunction with the annexed drawings, discloses various example embodiments of the disclosure.

BRIEF DESCRIPTION OF THE DRAWINGS

The above and other aspects, features and attendant advantages of the present disclosure will be more apparent and readily appreciated from the following detailed description, taken in conjunction with the accompanying drawings, in which like reference numerals refer to like elements, and wherein.

Throughout the drawings, like reference numerals will be understood to refer to like parts, components, and structures.

DETAILED DESCRIPTION

Figure 1:
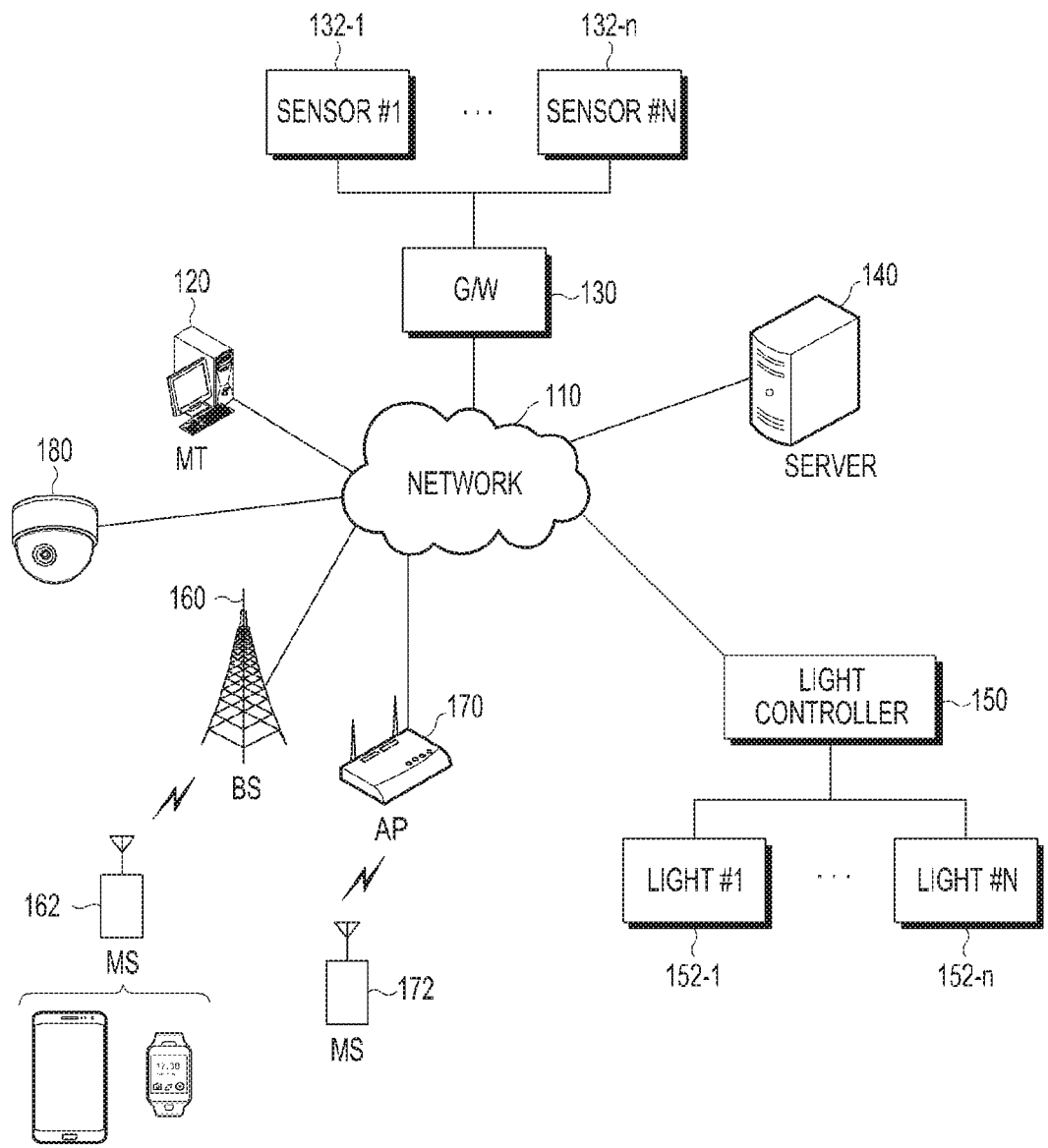
FIG. 1 is a diagram illustrating an example network environment for supporting light control according to various example embodiments of the present disclosure.

Various example embodiments of the present disclosure are described with reference to the accompanying drawings.

However, the scope of the present disclosure is not intended to be limited to the particular embodiments and it is to be understood that the present disclosure covers various modifications, equivalents, and/or alternatives falling within the scope and spirit of the present disclosure. In relation to a description of the drawings, like reference numerals denote the same components.

In the present disclosure, the term 'have', 'may have', 'include', or 'may include' signifies the presence of a specific feature (for example, number, function, operation, or component such as part), not excluding the presence of one or more other features.

In the present disclosure, the term 'A or B', 'at least one of A or/and B', or 'one or more of A or/and B' may cover all possible combinations of enumerated items. For example, 'A or B', 'at least one of A and B', or 'at least one of A or B' may represent all of the cases of (1) inclusion of at least one A, (2) inclusion of at least one B, and (3) inclusion of at least one A and at least one B.

The term as used in the present disclosure, 'first' or 'second' may modify the names of various components irrespective of sequence and/or importance, not limiting the components. These expressions are used to distinguish one component from another component. For example, a first user equipment (UE) and a second UE may indicate different UEs irrespective of sequence or importance. For example, a first component may be referred to as a second component and vice versa without departing the scope of the present disclosure.

When it is said that a component (for example, a first component) is 'operatively or communicatively coupled with/to' or 'connected to' another component (for example, a second component), it should be understood that the one component is connected to the other component directly or through any other component (for example, a third component). On the other hand, when it is said that a component (for example, a first component) is 'directly connected to' or 'directly coupled to' another component (for example, a second component), it may be understood that there is no other component (for example, a third component) between the components.

The term 'configured to' as used herein may be replaced with or may be used interchangeably with, for example, the term 'suitable for' 'having the capacity to', 'designed to', 'adapted to', 'made to', or 'capable of' under circumstances. The term 'configured to' may not necessarily mean 'specifically designed to' in hardware. Instead, the term 'configured to' may refer to a situation in which a device may be 'capable of' with another device or part. For example, 'a processor configured to execute A, B, and C' may refer, for example, to a dedicated processor (for example, an embedded processor) for performing the corresponding operations or a generic-purpose processor (for example, a central processing unit (CPU) or an application processor (AP)) for performing the operations.

The terms as used in the present disclosure are merely provided to describe specific embodiments, and are not intended to limit the scope of other embodiments. It is to be understood that singular forms include plural referents unless the context clearly dictates otherwise. Unless otherwise defined, the terms and words including technical or scientific terms used in the following description and claims may have the same meanings as generally understood by those skilled in the art. The terms as generally defined in dictionaries may be interpreted as having the same or similar meanings as or to contextual meanings of related technology. Unless otherwise defined, the terms should not be interpreted as ideally or excessively formal meanings. When needed, even when the terms are defined in the present disclosure, they should not be interpreted as excluding embodiments of the present disclosure.

According to various example embodiments of the present disclosure, an electronic device is a user terminal equipped with communication functionalities, which should be able to detect its position and generate position information based on the detected position. Electronic devices may be classified into, for example, a portable type, a wearable type, a cradle type, and an installed type.

The portable electronic device may, for example be at least one of a smart phone, a tablet personal computer (PC), a mobile phone, a video phone, an e-Book reader, a personal digital assistant (PDA), a portable multimedia player (PMP), an MP3 player, a mobile medical equipment, an electronic dictionary, a camcorder, a camera, or an electronic picture frame, or the like, but is not limited thereto.

Another example of the electronic device is a wearable device. According to various example embodiments, the wearable device may be at least one of an accessory type (for example, a watch, a ring, a bracelet, an ankle bracelet, a necklace, glasses, contact lenses, swimming goggles, or a head-mounted device (HMD)), a fabric or clothes type (for example, electronic clothes or a sports wear), an attached type (for example, a skin pad or a tattoo), or an implantable type (for example, an implantable circuit), or the like, but is not limited thereto.

The portable electronic device may be at least one of a navigator, a laptop PC, or a netbook computer, and an installed electronic device may be at least one of a desktop PC, a workstation, a medical equipment, or a surveillance camera such as a closed circuit TV (CCTV), or the like, but is not limited thereto.

According to some example embodiments, an electronic device may be at least one of furniture, part of a building/structure, an electronic board, an electronic signature receiving device, a projector, or various measuring devices (for example, water, electricity, gas or electro-magnetic wave measuring devices), or the like, but is not limited thereto.

According to various example embodiments, an electronic device may be one or a combination of two or more of the foregoing devices. In an embodiment, an electronic device may be a flexible electronic device. In addition, it will be apparent to one having ordinary skill in the art that an electronic device according to the present disclosure is not limited to the foregoing devices, and may be a new electronic device produced along with technology development.

Various example embodiments of the present disclosure provide a lighting environment that offers visual comfort to a user by controlling turn-on, turn-off, dimming, a steering angle, a color temperature, and so on of at least one light in a light control zone configured in a single open space. It may be assumed that the lighting environment offering visual comfort to a user is a place where light control has been performed so as to satisfy a visual comfort condition. The visual comfort condition may be set in comprehensive consideration of an illuminance, a color temperature, a steering angle, and so on at a current position of the user. Further, the visual comfort condition may include an emergency notification condition based on which occurrence of an emergency is recognized.

Various example embodiments of the present disclosure provide a method for configuring a light control zone and performing light control based on the light control zone, to thereby save energy as well as offer visual comfort to a user.

Illuminance may refer, for example, to a measure of dividing a luminous flux (the total luminosity of a light source) incident on a surface. That is, illuminance may be a luminous flux density at a point of interest (a reference point) on an illuminated surface. The illuminance may be measured in lux (lx).

Visual comfort may refer, for example, to a lighting state in which at least one of illuminance uniformity, dimming, glare, and contrast satisfies a user demand. For example, the visual comfort may refer to a subjective sense of comfort for each individual user, caused by an illumination effect in relation to accurate color representation. In this case, to provide user-desired visual comfort, a mapping table may be prepared, which sets a visual comfort condition defined by the brightness, color temperature, and direction of a light, for each user.

The visual comfort condition may, for example, refer to a condition set to satisfy a subjective sense of comfort caused by an illumination effect in relation to illuminance uniformity, luminosity, glare, contrast, accurate color representation, and so on. For example, the visual comfort condition may refer to a visual comfort illuminance. The visual comfort illuminance may refer, for example, to an illuminance that offers visual comfort. For example, the visual comfort illuminance may be set, referring to the European Standard for Light and Lighting-Lighting of Work Places-Part 1: Indoor Work Places, EN 12464-1, or the American National Standard Practice for Office Lighting, ANSI/IESNA RP-1-04. EN 12464-1 and ANSI/IESNA RP-1-04, which are publicized documents and thus will not be described herein in detail.

The single open space may refer, for example, to an independent space with an illuminance, a color temperature, a steering angle, a focused area size, and so on which may be affected by an installed light, such as an office, a meeting room, a living room, a bedroom, a bath room, a dining room, a swimming pool, a patient room, or a lecture room. For example, an office building may include an open space such as an office space, a lounge, or a meeting room. A house may include an open space such as a living room, a kitchen, or a dining room. A hotel may include an open space such as a lobby, a restaurant, a bar, a swimming pool, or a fitness center.

A school may include an open space such as a classroom, a library, or a cafeteria. A retailer/mall may include an open space such as a showroom, a digital signage, or a food court. A stadium may include an open space such as a stand, a score board, or a stage. A factory may include an open space such as an automated facility (a manufacture line), a manual workplace, or a warehouse.

A vehicle/transportation-related space may include an open space such as a road, a tunnel, or a parking lot. A city may include an open space such as a street lamp (in a public space or park), a subway station, or a bus stop. A hospital may include an open space such as a doctor's office, a patient's room, or an emergency room.

A light may, for example, be a generic term covering all types of lightings that provide a lighting environment to a user based on various brightness levels, color temperatures, steering directions (steering angles), types, and so on. For example, color temperature-based lighting (light source) types include light emitting diode (LED), incandescent light, fluorescent light, halogen light, organic LED (OLED), laser, electroluminescence (EL), and so on. A steering direction may refer, for example, to a direction in which a light provides illuminance, the size of a light zone, and so on.

Lights may be classified into ceiling-mounted, wall-attached, spotlight, pendent, chandelier, floor stand, floor-buried, and so on.

Turn-on may refer, for example, to a switch-on of a light, and turn-off may refer, for example, to a switch-off of a light. Dimming may refer, for example, to adjustment of the brightness of a light.

Terms used in various example embodiments of the present disclosure are set forth below.

Identification information: may refer, for example, to information used to identify an electronic device or a user. A device identifier (ID), a device serial number, or the like may be used as identification information identifying an electronic device, and a user ID, a user ID/password, a user registration number, or the like may be used as identification information identifying a user.

Context information: may refer, for example, to information referred to for providing a lighting environment to satisfy a visual comfort condition at a self-position of an electronic device. The context information may be self-position information about a user (electronic device), illuminance information sensed at the self-position of the user, health state information about the user, or the like. The health state information may include, for example, information about a heart rate measurement, a blood flow measurement, an oxygen saturation, or a blood pressure of the user.

Self-position information: may refer, for example, to information indicating its current position (self-position) measured or detected by an electronic device (or use).

Visual comfort condition: may refer, for example, to a criterion satisfying a user demand in terms of at least one of illuminance uniformity, luminosity, glare, and contrast. For example, the visual comfort condition may be a reference value for at least one of illuminance uniformity, luminosity, glare, and contrast, which produces an illumination effect in relation to a user-desired color representation for each individual user.

Light control zone information: may, for example, refer to information that defines a light control zone (a set of lights) configured to provide a lighting environment satisfying a visual comfort condition for at least one user in a single open space. The light control zone information may include a list of at least one light and/or a list of lights in an overlap zone.

Light control zone: may refer, for example, to a unit space to provide a lighting environment satisfying a visual comfort condition to a user. The lights of the light control zone may form a circle, a triangle, a square, a star, or the like.

Light control command: may refer, for example, to a command requesting light control for a specific light control zone, issued by an electronic device or a server. The light control command may include information needed for a light controller to provide visual comfort to a user.

Visual comfort illuminance: may refer, for example, to the intensity of illumination (illuminance) with which a user located in a specific light control zone may feel visual comfort. The visual comfort illuminance may be affected by at least one of illuminance uniformity, luminosity, and color.

Emergency recognition condition: may refer, for example, to a condition based on which an electronic device perceives occurrence of an emergency in consideration of a health state, an accident, and the like of a user. A reference value for checking a health abnormality, a noise level that may be caused by occurrence of an abnormality, or the like may be used as the emergency recognition condition.

Heath state information: may refer, for example, to information indicating a health state of a user. The health state information may be information about a heart rate, a heart flow, an oxygen saturation, a blood pressure, or the like.

Overlap zone: may refer, for example, to a zone over which a plurality of light control zones are overlapped. The overlap zone may be defined by at least one light installed in the zone.

Control authority level: may refer, for example, to a level into which a light control authority for a light control zone is classified. An electronic device with a high control authority level may take priority in light control.

Position variation: may refer, for example, to information that defines a change in position, caused by movement of an electronic device in a light control zone. The position variation may be used as a reference for changing the area of the light control zone.

Reference point: may refer, for example, to a position of a user (electronic device), a position at which an illuminance is measured by an illuminance simulation tool, or a position set arbitrarily to measure an illuminance and thus determine a visual comfort state. The reference point may be used in a different meaning according to an example embodiment.

In an example embodiment of the present disclosure as described below, a light control zone may be configured based on the position of a user, and at least one light in the light control zone is controlled, to thereby provide a lighting environment satisfying a visual comfort condition at the position of the user.

Further, in another example embodiment of the present disclosure, at least one light control zone may be pre-configured in a single open space, and a lighting environment satisfying a visual comfort condition is provided to a user, in consideration of the pre-configured light control zone and the position of the user.

Further, in another example embodiment of the present disclosure, occurrence of an emergency to a user may be recognized, and a light in a light control zone corresponding to the user may be controlled in a manner that satisfies a visual comfort condition suitable for the recognized emergency.

Now, a description will be given of an electronic device according to various example embodiments with reference to the attached drawings. In the present disclosure, the term "user" may refer to a user using an electronic device or a device using an electronic device (for example, an artificial intelligence electronic device).

FIG. 1 is a diagram illustrating an example network environment for supporting light control according to various example embodiments of the present disclosure.

Referring to FIG. 1, a network environment for supporting light control may be configured so that a server 140, a management terminal (MT) 120, a gateway 130, a base station (BS) 160, an access point (AP) 170, mobile stations (MSs) 162 and 172, a light controller 150, lights 152-1 to 152-*n*, sensors 132-1 to 132-*n*, and a private device 180 such as a closed circuit TV (CCTV) are interconnected through a network 110.

The components of the network environment may or may not be used according to various example embodiments. For example, the light controller 150, the server 140, and the electronic devices (MSs) 162 and 172 may be used in an example embodiment. In another example embodiment, the gateway 130 may be added to the light controller 150, the server 140, and the electronic devices (MSs) 162 and 172. In another example embodiment, an illumination sensor may be used in addition to the light controller 150, the server 140, the electronic devices (MSs) 162 and 172, and the gateway 130.

The server 140 may divide a single open space for light control into at least one light control zone, and perform light control directly or indirectly for the at least one light control zone. The division of the single open space into the at least one light control zone may refer, for example, to configuring the at least one light control zone.

In an example scenario, light control zones may be configured in a manner that satisfies a visual comfort condition for each desk in an office. In this case, when a user sits at a desk, the server 140 may receive a request message from an electronic device carried by the user. The request message may include identification information identifying or indicating the electronic device, and context information. The context information may include, for example, self-position information indicating the position of the desk and illuminance information indicating an illuminance measured at the desk.

The server 140 may determine or acquire a visual comfort condition for providing visual comfort to the user sitting at the desk, in consideration of the identification information and context information included in the request message. The server 140 may configure a light control zone to satisfy the determined or acquired visual comfort condition corresponding to the desk, and configure (generate) light control zone information that defines the configured light control zone. Visual comfort in the light control zone may be determined by, for example, an illuminance, a color temperature, a steering angle, and/or a focused area size at the desk.

The server 140 may provide the configured light control zone information to the electronic device. The server 140 may transmit to the light controller 150 a light control command requesting control of at least one light installed in the light control zone, so that the lighting environment of the light control zone may satisfy the determined or acquired visual comfort condition based on the configured light control zone information.

The server 140 may display a light control zone configured on a per-user basis, an overlap zone between the light control zones, a lighting environment of each light control zone, and the like on a display.

The server 140 may configure a light control zone corresponding to each user (electronic device) in a single open space, and generate or change a database (DB) for the per-user light control zones.

To configure at least one light control zone in a single open space for light control, the server 140 should be able to collect or calculate (determine) information about an illuminance measured at at least one reference point (the position of an electronic device, a user, a desk, or the like) within the space. The illuminance information may be collected though context information reported by the electronic device, calculated by a specific tool, or received from the user. For example, a major example of the illuminance calculation tool is Radiance.

The server 140 may receive a report of a measured illuminance from a component (an electronic device, an illumination sensor, an illuminance measurer, or the like) located, installed, or deployed at a reference point, in order to configure a light control zone. For example, the server 140 may acquire an illuminance of natural light using an optical sensor attached on a window, a total illuminance using an illumination sensor attached on a ceiling, an illuminance at a specific position (the current position of the electronic device) using an internal illumination sensor of the electronic device, or an illuminance on the surface of the desk using a handy illuminometer or an attached-type illumination sensor. Additionally or alternatively, the server 140 may calculate (determine) an illuminance.

A light control zone may be configured in various manners according to the present disclosure, such as, for example, and without limitation, by dynamic configuration and pre-configuration.

In the dynamic configuration scheme, the server 140 may determine the current position of an electronic device, and configure a light control zone with a minimum number of lights that enable a lighting environment at the current position of the electronic device to satisfy a visual comfort condition, by controlling lights that may affect the lighting environment at the current position of the electronic device. To satisfy the visual comfort condition with the lighting environment at the current position of the electronic device, light control may be performed in order of proximity to the current position of the electronic device or an overlap zone. For example, in the absence of an overlap zone, a light to be controlled may be selected in order of proximity to the current position of the electronic device. On the other hand, in the presence of an overlap zone, a light to be controlled may be selected in order of proximity to the overlap zone.

In the pre-configuration scheme, the server 140 may pre-measure illuminance variances from light control on a per-reference point basis, build a database (DB) with the illuminance variances, and configure light control zones at desired positions based on the DB.

For example, the server 140 may set at least one reference point in a light control space, and sequentially select the at least one reference point. For the selected reference point, the server 140 may control sequential turn-on of surrounding lights until a target illuminance is measured at the selected reference point. The server 140 may configure a light control zone corresponding to the at least one reference point, with a minimum number of lights that should be turned on to achieve the target illuminance at the reference point.

For this purpose, it may be preferred to measure an illuminance in an environment with a minimal factor affecting illuminance measurement aside from turned-on lights. For example, an illuminometer may be deployed at each work position at night without natural light, and a minimum and/or reduced combination of lights that results in a target illuminance measurement at the work position may be detected, while turning on lights around the illuminometer one after another.

According to an example embodiment, the server may measure an illuminance at at least one reference point in a light control space, while turning on and off all lights installed within the space, one after another. Illuminances measured at the at least one reference point when the lights are turned on one by one may be stored in a table.

For this purpose, it may be preferred to measure an illuminance in an environment with a minimal and/or reduced factor affecting illuminance measurement aside from turned-on lights. For example, an illuminometer may be deployed at each work position at night without natural light, and the illuminance of each light affecting the work position may be stored in a DB, while turning on and off surrounding lights of the illuminometer one by one.

If the DB is generated in the above manner, a minimum and/or reduced number of lights to be turned on to acquire a target illuminance at an arbitrary point are selected, and a light control zone corresponding to the point may be configured with the selected lights. For example, an illuminance at the point may be estimated by a combination of illuminances measured when each light is turned on.

According to an example embodiment, the server 140 may configure different light control zones in different time zones, in additional consideration of natural light measured on a per-time zone basis. For example, the number or brightness of lights may be increased in a light control zone in a time zone with an illuminance less affected by natural light (for example, at night), compared to a time zone with an illuminance more affected by natural light (for example, in the daytime). However, considering that there is little chance that natural light is constant in each time zone every day, it may be reflected through real measurement.

The server 140 may monitor movement of an electronic device (e.g., an MS or the like). Upon occurrence of an event triggering light control due to the movement of the electronic device, the server 140 may perform light control based on the event. For example, the light controller 150 may perform light control by turning on and off the lights of a target light control zone, and setting the brightness of the turned-on lights, in response to a light control command for the target light control zone, received from the server 140.

According to an example embodiment, if the electronic device leaves a light control zone, the server 140 may sense the leaving of the electronic device. In the absence of any electronic device in the light control zone, the server 140 may command the light controller 150 to turn off all lights of the light control zone. On the other hand, in the presence of any other electronic device in the light control zone, the server 140 may perform light control separately for the remaining electronic device.

For example, to provide a target illuminance to the remaining electronic device, the server 140 may update the light control zone and control lights of the updated light control zone. In other words, the server 140 may prepare a procedure for differentiating light control for a plurality of users from light control for a single user.

When turning off all lights of the light control zone, the server 140 may need to determine whether the light control zone includes an overlap zone. The reason is that if all lights of a light control zone including an overlap zone are turned off, the illuminance of another light control zone sharing the overlap zone may be affected.

Accordingly, if the light control zone includes an overlap zone, the server 140 may need to additionally perform light control for another light control zone sharing the overlap zone so that visual comfort may be provided continuously to an electronic device located in the other light control zone.

According to an example embodiment, the server 140 may perform light control for a light control zone based on the position of an electronic device. The server 140 may perform light control for the light control zone in consideration of the position of the electronic device, to thereby provide visual comfort to the electronic device.

For example, to provide visual comfort in the light control zone, the server 140 may command the light controller 150 to turn on lights and adjust the brightness of the turned-on lights so that a predetermined visual comfort condition may be satisfied. If the electronic device enters an already configured light control zone, the server 140 may not perform light control for the light control zone because it may consider that light control has already been performed for the visual comfort of the light control zone.

However, if it is necessary to change a visual comfort condition required for the light control zone due to the entry of the electronic device, the server 140 may perform light control for the light control zone in consideration of the new electronic device. For example, if light control has been performed for an existing electronic devices in a centralized illumination scheme, additional light control may be needed to provide visual comfort to the new electronic device.

According to an example embodiment, to provide visual comfort to a user in a light control zone, the server 140 may perform light control in consideration of an illumination type, a color, a color temperature, a steering angle, and a focused area in addition to an illuminance. For this purpose, the server 140 may further collect context information. For example, the server 140 should be able to additionally collect, estimate, or calculate the types of lights arranged in the light control zone, color temperatures available with combinations of lights, steering angles, and focused areas.

According to an example embodiment, since a light control scenario may be differentiated according to the usage of a space in which a light control zone is configured (for example, an office, a house, a hotel, a school, a retailer/mall, a stadium, a factory, a vehicle/transportation, a city, and a hospital), light control may be performed in additional consideration of corresponding information. The server 140 may configure a different light control zone in consideration of the usage of a light control space.

For example, the server 140 may identify the cause of an event triggering light control, and command the light controller 150 to perform light control suitable for the cause. For example, the server 140 may operate in different light control scenarios for the case of a light control request from the electronic device due to an abnormal health state and for the case of a light control request from the electronic device due to occurrence of an accident.

For example, if a light control-triggering event is an abnormal health state, the server 140 may control the lights of the light control zone to focus illumination at the position of the event occurrence. On the other hand, if occurrence of a traffic accident triggers light control, the server 140 may control the lights of the light control zone so that a street lamp may flicker in the accident area or the color of lights may be changed in the accident area.

According to an example embodiment, upon sensing an environment change requiring a change in light control in a light control zone for which light control has been performed, the server 140 may perform additional light control to provide visual comfort in consideration of the sensed environment change.

For example, if a user stops viewing TV and then starts to use a massager, with light control already adapted to the comfort of TV viewing, the server 140 may command the light controller 150 to perform light control so that a target illuminance optimized for TV viewing may be changed to a target illuminance optimized for the massager.

The server 140 may receive a light control authority request from the electronic device 162 or 172 through the base station (BS) 160 or the access point (AP) 170 connected to the network 110, and grant the light control authority to the electronic device 162 or 172 by verifying the electronic device 162 or 172. For this purpose, the server 140 may provide the whole or part of information collected for light control to the electronic device 162 or 172.

The light controller 150 may perform light control for a target light control zone, based on the command received from the server 140. For example, the light controller 150 may perform light control to turn on or off the lights 152-1 to 152-*n* of the target light zone, and set a brightness, a color temperature, a steering angle, and the like for the turned-on lights. The light controller 150, which is a device that controls lights, may communicate with lights in conformance to a specific protocol (for example, digital addressable lighting interface (DALI: International Electrotechnical Commission (IEC 62386)-based interface)).

For configuration of a light control zone, the electronic device 162 or 172 may periodically or aperiodically report an illuminance measured at the position (self-position or reference point) of the electronic device 162 or 172 to the server 140. The electronic device 162 or 172 may acquire position information (self-position information) about the electronic device 162 or 172 and report the acquired self-position information to the server 140.

According to an example embodiment, the electronic device 162 or 172 may communicate with the server 140 in a predetermined signaling procedure, and acquire a light control authority for a light control zone in which the electronic device 162 or 172 is located, and information required for light control. Once the electronic device 162 or 172 acquires the light control authority, the electronic device 162 or 172 may directly perform light control for the light control zone which the electronic device 162 or 172 has been authorized to control.

In this case, the electronic device 162 or 172 may have to have prepared a UI screen for configuring light control zones and processing light control for a target light control zone. For example, the electronic device 162 or 172 may support a UI that displays functions available in a light control zone, in addition to a screen that displays the current position of the electronic device 162 or 172 and a configured light control zone.

The management terminal (MT) 120 may receive management information for managing and maintaining light control zones, and output information about configuration and light control of light control zones, performed by the server 140. For example, the MT 120 may support a UI for a manager. For example, the MT 120 may have a UI for displaying a light control state, an error state, a total power consumption for lights, and so on in a whole space.

The gateway 130 may include a wired/wired network interface, and connect various types of sensors 132-1 to 132-*n* to the network 110. The gateway 130 may provide sensing information received from the sensors 132-1 to 132-*n* to the server 140 or the like. For example, the sensors 132-1 to 132-*n* may include an illumination sensor. The illumination sensor may be installed in a light control space, measure an illuminance at the installed position, and provide information about the illuminance measurement to the server 140 through the gateway 130.

While not shown, a wireless signal generator may further be provided. The wireless signal generator may generate a wireless fidelity (WiFi), ZigBee, Bluetooth low energy (BLE), or radio frequency (RF) signal. The wireless signal generated from the wireless signal generator may be used for an electronic device to estimate its position. The wireless signal generator such as a wireless AP may be incorporated with the gateway 130.

In the above-described network environment, a connection may be established between the light controller 150 and the server 140 in conformance to a communication protocol such as, for example, and without limitation, Helvarnet, IP, BACnet, or KNX, and connections may be established between the electronic devices (MSs) 162 and 172 and the server 140 in conformance to a communication protocol such as WiFi, BLE, ZigBee, ZigWave, or Cellular (3G/4G/5G). Connections may be established between the lights 152-1 to 152-*n* and the light controller 150 support at least one of DALI (IEC 62386-based interface), DMX512 (stage lighting standard), and KSX4506-2 (Korean standard), and a connection may be established between the gateway 130 and the server 140 by at least one of a wireless/wired local area network (LAN), power over Internet (PoI), and fiber to the home (FTTH: optical cable).

Figure 2:
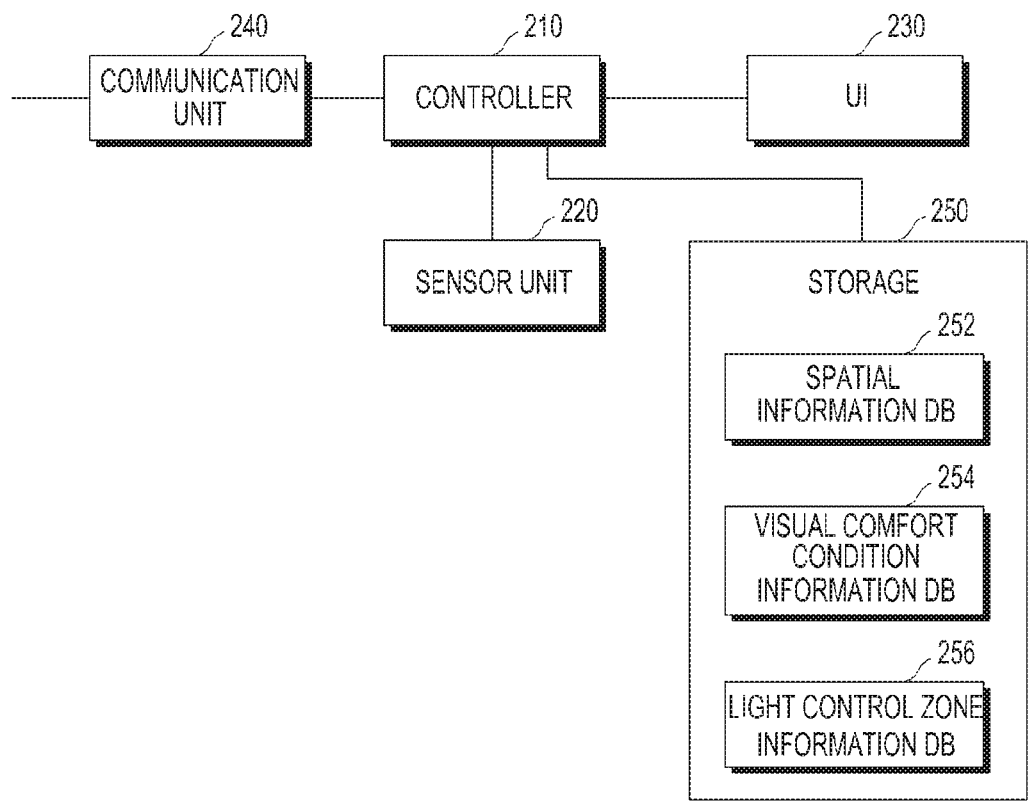
FIG. 2 is a block diagram illustrating an example electronic device according to various example embodiments of the present disclosure.

FIG. 2 is a block diagram illustrating an example electronic device according to various example embodiments of the present disclosure.

Referring to FIG. 2, each of the electronic devices 162 and 172 may include a communication unit (e.g., including communication circuitry) 240, a controller (e.g., including processing circuitry) 210, a UI unit 230, a sensor unit (e.g., including at least one sensor) 220, and a storage 250.

The communication unit 240 may include various communication circuitry configured to communicate with an external device in at least one communication scheme supported by the electronic device 162 or 172. The communication unit 240 may receive signals from one or more wireless signal devices and estimate its position using the received signals under the control of the controller 210.

The communication unit 240 may provide information about the estimated position or received position information to the server under the control of the controller 210. The communication unit 240 may provide context information to the server under the control of the controller 210. The communication unit 240 may provide information about a visual comfort condition to the server under the control of the controller 210.

The communication unit 240 may receive spatial information and light control zone information from the server. The communication unit 240 may transmit a light control command to the light controller and receive a response signal to the light control command from the light controller, under the control of the controller 210.

The UI unit 230 may include various circuitry configured to output necessary information to a user or output information received from the user to the controller 210. For example, the UI unit 230 may receive position information from the user and provide the received position information to the controller 210.

The UI unit 230 may include a display. The display may display a light control zone configured for the display under the control of the controller 210. The display may display a space in which the electronic device is located, and display the light control zone configured for the display, overlappingly on the displayed space, under the control of the controller 210. The display may display a lighting environment according to light control for the light control zone configured for the display.

The sensor unit 220 may include various types of sensors to sense context information. The sensor unit 220 may include, for example, an illumination sensor for measuring an ambient illuminance and providing a sensing result related to the ambient illuminance measurement to the controller 210. The sensor unit 220 may further include, for example, a global positioning system (GPS) and a gyro sensor to acquire current position information about the electronic device, and provide sensing results produced by the GPS and the gyro sensor to the controller 210.

The controller 210 may include various processing circuitry and configure (generate) context information based on information collected through the sensor unit 220 and received external information, and transmit the context information and identification information to the server through the communication unit 240.

The controller 210 may receive light control zone information from the server through the communication unit 240 and configure (generate) a light control command using the received light control zone information. The light control command may be configured so as to, for example, satisfy a visual comfort condition based on the light control zone information. The controller 210 may transmit the configured light control command to the light controller through the communication unit 240.

The controller 210 may control the display included in the UI unit 230 to display the light control zone configured for the display, using the light control zone information received from the server. The controller 210 may control the display to display an image of the space in which the controller 210 is located, based on the spatial information received from the server. In this case, the controller 210 may control the display to additionally display the light control zone configured for the controller 210 on the displayed space image.

The controller 210 may receive a light control process result received from the light controller through the communication unit 240, and control the display to display the received light control process result.

The controller 210 may collect information about an emergency, include the collected emergency information in context information, and transmit the context information to the server through the communication unit 240. For example, the controller 210 may collect information about a health state of the user measured through the sensor unit 220, and transmit the collected health state information to the server trough the communication unit 240.

Upon recognition of occurrence of an emergency from the collected emergency information, the controller 210 may transmit a light control command indicating the occurrence of the emergency to the light controller through the communication unit 240. In this case, the light control command requests the light controller to provide a lighting environment satisfying an emergency notification condition of the user as a visual comfort condition to a light control zone.

According to an example embodiment, the controller 210 may autonomously control an operation for light control for the light control zone. For example, upon receipt of a light control request from the user through the UI unit 230, the controller 210 may request a light control authority for a target light control zone to the server through the communication unit 240.

If the server grants the light control authority for the target light control zone to the controller 210, the controller 210 may perform light control for the target light control zone. For this purpose, the controller 210 needs to prepare a UI to be provided through the UI unit 230. That is, the UI unit 230 may display the current position of the user, a light control zone configuration screen, and functions available in the light control zone.

The storage 250 may include a spatial information DB 252, a visual comfort condition DB 254, and a light control zone information DB 256. The spatial information DB 252 may manage information about a space at a current position or a previous position of the electronic device, that is, a layout, desk deployment, light deployment, and so on.

The visual comfort condition DB 254 may manage a lighting environment condition that offers visual comfort to the user, in consideration of the current position of the user, user settings, and so on. The light control zone information DB 256 may manage light control zone information about a light control zone configured in correspondence with the current position or previous position of the electronic device. The visual comfort condition DB 254 may include or be replaced with an emergency notification condition DB.

Figure 3:
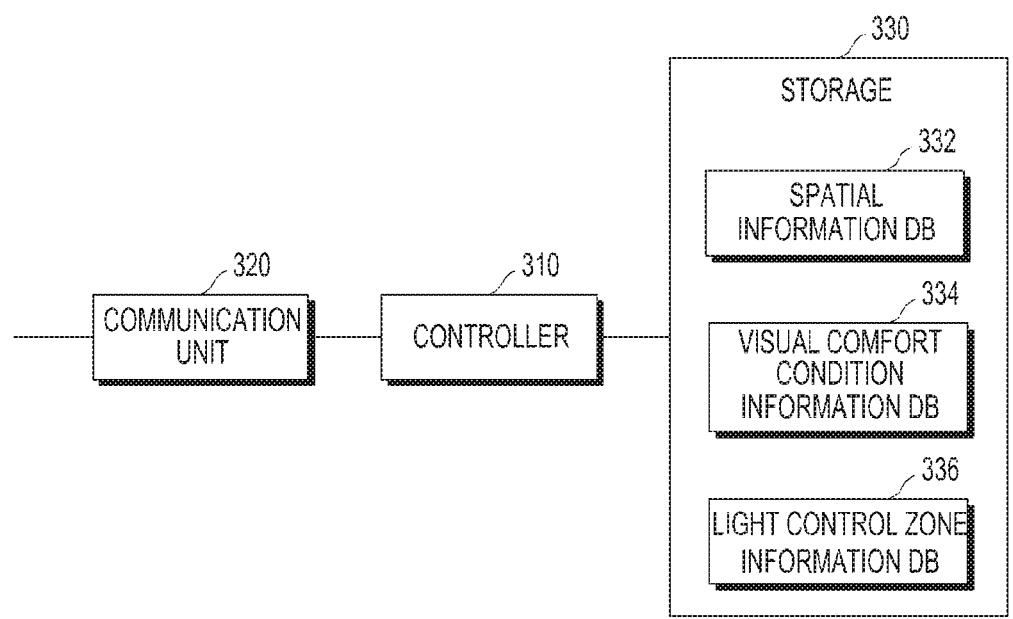
FIG. 3 is a block diagram illustrating an example server according to various example embodiments of the present disclosure.

FIG. 3 is a block diagram illustrating an example server according to various example embodiments of the present disclosure.

Referring to FIG. 3, the server 140 may include a communication unit (e.g., including communication circuitry) 320, a controller (e.g., including processing circuitry) 310, and a storage 330. The storage 330 may include a spatial information DB 332, a visual comfort condition DB 334, and a light control zone information DB 336.

The communication unit 320 may include various communication circuitry configured to communicate with the electronic device to configure a light control zone, and with the light controller to perform light control for a light control zone. The communication unit 320 may, for example, receive identification information and context information from the electronic device and transmit light control zone information to the electronic device. The communication unit 320 may transmit a light control command based on the light control zone information configured for the electronic device to the light controller.

The controller 310 may include various processing circuitry and configure (generate) light control zone information for generation/change (in size)/state change (activation/deactivation) of a light control zone in order to satisfy a visual comfort condition corresponding to the identification information and the context information received from the electronic device through the communication unit 320. The controller 310 may transmit the configured light control zone information to the electronic device through the communication unit 320.

The controller 310 may configure (generate) a light control command using the configured light control zone information and transmit the configured light control command to the light controller through the communication unit 320. The light control command requests the light controller to control the lights of the light control zone, so that a lighting environment satisfying a visual comfort condition may be provided at the self-position of the electronic device.

If the context information includes self-position information and health state information about the user, the controller 310 may transmit a light control command requesting control of the lights of the light control zone to the light controller, so that a lighting environment satisfying an emergency notification condition may be provided at the self-position indicated by the self-position information.

The storage 330 may include the spatial information DB 332, the visual comfort condition DB 334, and the light control zone information DB 336. The spatial information DB 332 may manage information about a space at a current position or a previous position of the electronic device, for example, a layout, desk deployment, light deployment, and so on. The visual comfort condition DB 334 may manage a lighting environment condition offering visual comfort to the user, in consideration of the current position of the use, user settings, and so on. The light control zone information DB 336 may manage light control zone information about a light control zone configured in correspondence with the current position or previous position of the electronic device. The visual comfort condition DB 336 may include or be replaced with an emergency notification condition DB.

Figure 4:
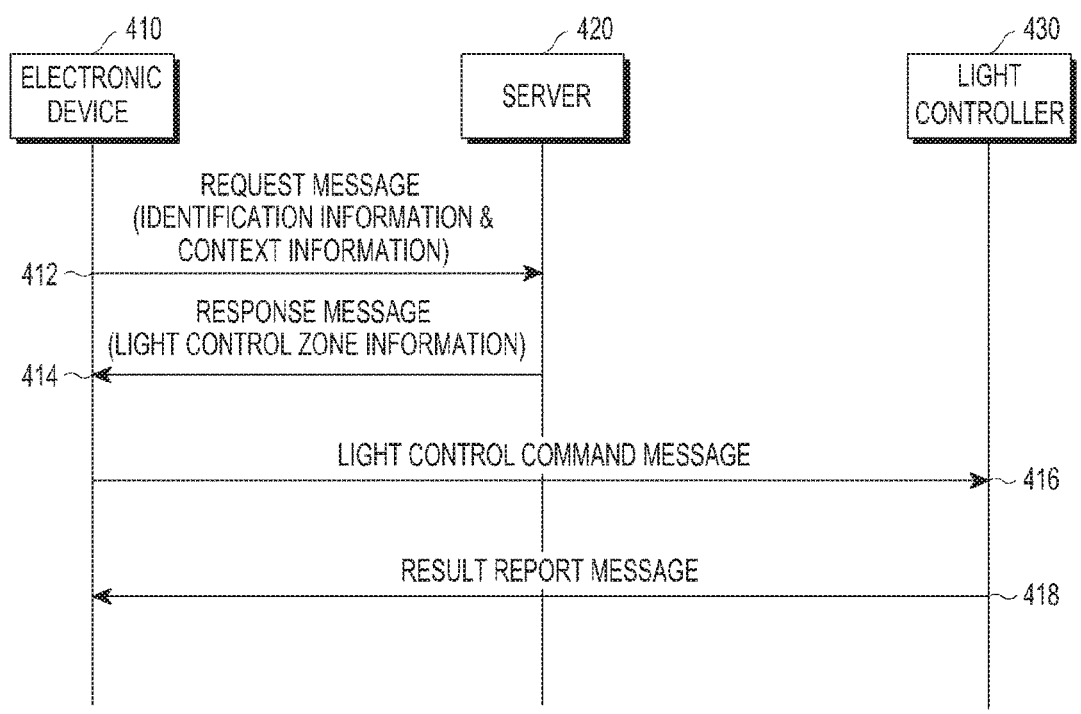
FIG. 4 is a diagram illustrating an example signal flow for a light control procedure according to various example embodiments of the present disclosure.

FIG. 4 is a diagram illustrating an example signal flow for a light control procedure according to various example embodiments of the present disclosure. The light control procedure illustrated in FIG. 4 is based on the assumption of a scenario in which an electronic device 410 commands light control to a light controller 430.

Referring to FIG. 4, the electronic device 410 transmits a request message to a server 420 in operation 412. For example, the request message may be transmitted to request an operation related to light control to the server 420. The operation related to light control may be, for example, configuring a light control zone or performing light control in a manner that satisfies a visual comfort condition at a position of the electronic device 410.

The request message may include, for example, identification information and context information. The identification information is information by which the server 420 identifies the electronic device 410 or a user of the electronic device 410. The context information may be at least one piece of information that the server 420 will refer to for light control for the electronic device 410. The identification information and the context information may be understood as defined before.

If the context information includes self-position information, the electronic device 410 may be a portable user terminal capable of generating self-position information or acquiring a self-position.

If the context information includes illuminance information, the electronic device 410 may measure or acquire an illuminance at its self-position, and generate the illuminance information based on the measured or acquired illuminance.

If the context information further includes health state information about the user, the electronic device 410 may be, for example, a wearable device that measures the heart rate, blood flow, oxygen saturation, blood pressure, or the like of the user, and generates the health state information about the user based on the measurement.

The server 420 may receive the request message from the electronic device 410 in operation 412. The server 420 may configure a light control zone so that a visual comfort condition corresponding to the identification information and the context information included in the received request message may be satisfied, and may generate, change, or change a state (activate or deactivate) of light control zone information based on the configured light control zone. For example, the visual comfort condition may be a visual comfort illuminance which is a desired illuminance at the self-position of the electronic device 410.

The server 420 may, for example, determine the self-position of the electronic device 410 based on the self-position information included in the context information, and select lights that may affect a visual comfort condition for the determined self-position. The server 420 may determine at least one target light to be controlled in order to achieve a lighting environment satisfying the visual comfort condition at the determined self-position, and generate a target control light list indicating the determined target lights to be controlled. The server 420 may generate or change light control zone information to include the generated target control light list in the light control zone information. For example, the target lights may be lights to be turned on to achieve a visual comfort illuminance at the self-position of the electronic device 410.

The server 420 may determine whether there is at least one light used repeatedly to configure another light control zone among the at least one light listed in the target control light list, and configure an overlap zone with the at least one light. In this case, the server 420 may generate overlap zone information based on the configured overlap zone. For example, the overlap information may include a light list indicating at least one light included in the overlap zone.

The server 420 may include a light control zone information DB for managing light control zone information. The light control zone information DB may manage overlap zone information together with the light control zone information.

The server 420 may further include, for example, a spatial information DB, a visual comfort condition DB, and a light control command DB. The spatial information DB may manage information about the layout of a space which may be a light control target, furniture arrangement, the positions of installed lights, and so on. The visual comfort DB may manage a visual comfort condition corresponding to context information received from the electronic device. The light control command DB may manage commands for controlling turn-on or turn-off, brightness (illuminance), light color, color temperature, steering angle (illumination direction), focused area size, and so on of lights in a specific light control zone.

The server 420 may configure (generate) a response message including light control zone information corresponding to the identification information and context information received from the electronic device 410, and transmit the configured response message to the electronic device 410 in operation 414. The light control zone information may include a target control light list that define target lights to be controlled in order to satisfy a visual comfort condition. If the light control zone includes an overlap zone, the response message may further include overlap zone information. The overlap zone information may include a light list indicating at least one light included in the overlap zone.

The server 420 may display the light control zone configured for the at least one electronic device 410 on the display based on the light control zone information provided to the electronic device 410. If there is an overlap zone between light control zones configured for a plurality of electronic devices, the server 420 may display an overlap zone on the display in addition to the light control zone configured for each of the electronic devices.

In operation 414, the electronic device 410 may receive the response message to the request message from the server 420. The response message may include, for example, the target control light list indicating at least one target light as defined to measure an illuminance satisfying the visual comfort condition at the self-position. The response message may include, for example, the light list indicating at least one target light included in the overlap zone.

In an example embodiment, in the absence of an overlap zone, the target control light list may indicate a minimum number of lights with which to provide a lighting environment satisfying the visual comfort condition at the self-position, when the lights are turned on or their brightness is controlled in order of proximity to the self-position. If the visual comfort condition is a visual comfort illuminance, the target control light list may indicate a minimum number of lights that satisfy the visual comfort illuminance at the self-position, when the lights are turned on or their brightness is controlled in order of proximity to the self-position.

In another example embodiment, in the presence of an overlap zone, the target control light list may indicate at least one light included in the overlap zone indicated by the overlap zone information included in the response message, and a minimum number of lights with which to provide a lighting environment satisfying the visual comfort condition at the self-position, when the lights are turned on or their brightness is controlled in order of proximity to the overlap zone after the at least one light is turned on or its brightness is controlled. If the visual comfort condition is a visual comfort illuminance, the target control light list may indicate at least one light included in the overlap zone, and a minimum number of lights satisfying the visual comfort illuminance at the self-position, when the lights are turned on or their brightness is controlled in order of proximity to the overlap zone after the at least one light is turned on or its brightness is controlled.

The electronic device 410 may display the light control zone configured for the electronic device 410 on the display based on the light control zone information included in the response message. If the response message further includes overlap zone information, the electronic device 410 may further display an overlap zone between the light control zone configured for the electronic device 410 and a light control zone allocated to another electronic device.

The electronic device 410 may display a space image corresponding to the self-position on the display, and display the light control zone configured for the electronic device 410, overlappingly over the space image. The space image may be generated, for example, based on spatial information received from the server 420.

The electronic device 410 may configure (generate) a light control command message to satisfy the visual comfort condition based on the light control zone information included in the response message. The light control command message requests control of at least one light listed in the target control light list so that a lighting environment corresponding to the visual comfort condition at the self-position of the electronic device 410 may be achieved. The light control command message may include information required to control, for example, an illuminance, color temperature, steering angle, and focused area size of a target light to be controlled in order to achieve the lighting environment corresponding to the visual comfort condition at the self-position of the electronic device 410.

The electronic device 410 may, for example, predetermine an emergency recognition condition. Upon recognition of an emergency satisfying the predetermined emergency recognition condition, the electronic device 410 may configure (generate) a light control command message to notify the recognized emergency. In this case, the light control command message may include information required for light control so that a visual comfort condition defined to enable recognition of a place in which and a person to which the emergency has occurred. That is, the light control command message may be configured so as to include information that indicates at least one target light to be turned on in order to indicate the emergency, and information that defines a brightness, steering angle, illumination type, and so on of the at least one target light. In this case, the illumination type may mean how the light is to be illuminated, such as flickering with a predetermined periodicity.

The electronic device 410 may transmit the light control command message to the light controller 430 in operation 416. As set forth above, the light control command message may include, for example, information about a target light, and an illuminance, color temperature, steering angle, focused area size, and so on of the target light.

The light controller 430 may receive the light control command message in operation 416. The light controller 430 may control the lighting environment of the light control zone based on the received light control command message.

The light controller 430 may provide an illuminance satisfying the visual comfort condition at the self-position of the electronic device 410, for example, by turning on the target light among the lights of the light control zone. The light controller 430 may additionally control the brightness of the target light to provide an illuminance satisfying the visual comfort condition. Further, the light controller 430 may control the target light so that at least one of the color temperature, steering angle, and focused area size at the self-position of the electronic device 410 may satisfy the visual comfort condition.

For example, upon receipt of a light control command message indicating an emergency from the electronic device 410, the light controller 430 may perform light control for the light control zone in order to notify the occurrence of the emergency based on information included in the light control command message.

The light controller 430 may perform light control for the light control zone based on the light control command message, configure (generate) a result report message based on the result of the light control, and transmit the result report message to the electronic device 410 in operation 418.

The electronic device 410 may receive the result report message from the light controller 430, and display a light control state of the light control zone on the display according to the received result report message in operation 418.

Figure 5:
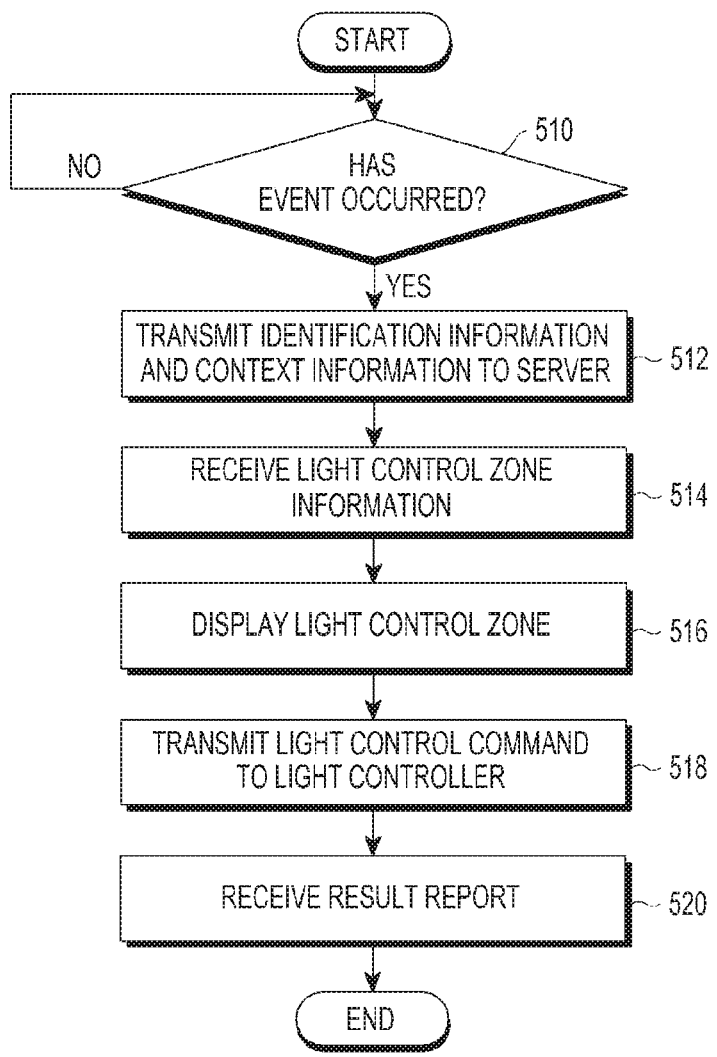
FIG. 5 is a flowchart illustrating an example operation of an electronic device for performing light control based on a light control zone according to an example embodiment of the present disclosure.

FIG. 5 is a flowchart illustrating an example operation of an electronic device for performing light control based on a light control zone according to an example embodiment of the present disclosure. The flowchart illustrated in FIG. depicts an example operation of the electronic device based on the light control procedure of FIG. 4.

Referring to FIG. 5, the electronic device monitors whether an event related to light control has occurred in operation 510. The event related to light control may correspond to occurrence of a situation requiring light control to satisfy a visual comfort condition at the self-position of the electronic device.

The event related to light control may occur, for example, when the electronic device enters a space with a light installed in it or leaves a light control zone. The event related to light control may occur, for example, due to a change in a task performed by a user of the electronic device. The change of the task performed by the user of the electronic device may correspond to, for example, the user's listening to music, stopping reading. The event related to light control may occur, for example, by recognizing an emergency satisfying a predetermined emergency recognition condition. For example, the electronic device may check the health state of the user, and if the result of the health state check satisfies the predetermined emergency recognition condition, may sense an event of occurrence of an emergency. In this case, the electronic device may be a wearable device.

Upon recognition of occurrence of an event, the electronic device may transmit identification information and context information to a server in operation 512. The identification information and the context information may be included and transmitted in a request message. The identification information and the context information have been defined before.

For example, the electronic device may receive wireless signals transmitted from one or more positions, and estimate its position using the received signals. For example, the electronic device may estimate its position by triangulation based on the received strength of an RF signal.

Generally, triangulation is a measurement technique performed in vast nature, for determining a planar position using a mathematical formula that calculates the length of the other side of a triangle based on the length of one side of the triangle and the angles of both sides. With the use of triangulation, the position of a moving entity capable of transmitting/receiving a wireless signal may be estimated in real time.

For example, the electronic device (moving entity) may receive a signal with a predetermined transmission strength from each of three reference points (APs), calculate (determine) signal loss from the respective reference points using the received strengths of the signals and the predetermined transmission strength, and acquire the distance to each reference point using the calculated signal loss. The electronic device may calculate the specific position, that is, the coordinates of the position of the electronic device by substituting the distances to the respective reference points into a mathematical formula that defines the coordinates of the specific position (the position of the electronic device).

According to an example embodiment, triangulation, finger printing, and the like which are viable in a wireless local area network (WLAN, WiFi) environment, pedestrian dead reckoning (PDR) using an inertial sensor such as a gyro sensor, an accelerometer sensor, or a gyro compass sensor, or a hybrid technique is available as a positioning scheme for estimating the position of a user using a portable electronic device. Besides, the position of the electronic device may be determined by BLE, Zigbee, RFID, UWB, a geomagnetic field, LED (VLC: optical communication), NFC, GPS, cellular (3/4/5G), infrared (IR), or the like.

In another embodiment, the position of the electronic device may be estimated using ultrasonic waves, IR rays, a CCTV, a charge coupled device (CCD), RF mesh, RF scan, or a position-fixed electronic device such as a motion sensor.

According to an example embodiment, illuminance information measured or calculated at the position (reference point) of the electronic device (MS, an illumination sensor, or the like) may be included in the context information. How an illuminance is sensed has been described before.

Presence or absence information may indicate whether the user is occupying a specific space/seat (reference point). The presence or absence may be monitored using at least one of space division (layout or map such as a blue print) information and position sensing.

Density information may indicate the number of electronic devices (MSs) or clustering (an extent to which users are gathered) of electronic devices (or MSs) within a specific space (light control zone). The density information may be monitored by referring to at least one of the space division information (layout or map such as a blueprint) and position sensing.

Flow of movement information indicates a path in which an electronic device (MS or the like) has moved from a specific time point to a current time point. The flow of movement may be predicted based on position sensing.

Time zone information is information about a time zone at the current position of the electronic device (MS or the like). The time zone information may be estimated based on GPS-based device position sensing and time zone information, network-based time synchronization (network time protocol (NTP)), or the like.

Activity information indicates an activity (using a PC, reading, sleep, rest, workout, eating, talking, or the like) at the current position of the electronic device (MS or the like). The activity information may be estimated by a vision (camera) sensor, an inertial sensor (a gyroscope, an accelerometer, or a geomagnetic sensor), or the like.

Emotional state information indicates an emotion (joy, sorrow, anger, fear, or the like) that the user feels at the current position. The emotional state information may be estimated using a brain-computer interface (BCI), a vision (camera or CCTV) sensor, or the like.

Weather/environment information is environment-related information such as weather, temperature, humidity, air quality (a fine dust level), or an ultraviolet (UV) index, at the current position of the electronic device (MS or the like). The weather/environment information may be acquired by receiving Internet-based local weather information, or measured by means of a temperature sensor, a humidity sensor, a fine dust sensor, a UV sensor, or the like.

The electronic device may receive light control zone information from the server in operation 514. The light control zone information may be received, for example, in a response message to a request message transmitted upon generation of the event. The light control zone information may include, for example, a target control light list. The target control light list may list at least one target light for control as defined in order to measure an illuminance satisfying a visual comfort condition at the self-position. The light control zone information may include, for example, a light list listing at least one target light included in an overlap zone.

The electronic device may display a light control zone configured for the electronic device on the display based on the light control zone information in operation 516. If the light control zone information further includes overlap zone information, the electronic device may further display an overlap zone between the light control zone configured for the electronic device and a light control zone allocated to another electronic device, on the display.

The electronic device may display a space image corresponding to the self-position on the display, and display the light control zone configured for the electronic device, overlappingly over the space image. The space image may be generated based on, for example, spatial information received from the server.

The electronic device may configure (generate) a light control command message based on the light control zone information. The light control command message requests the light controller to control at least one light listed in the target control light list so that a lighting environment satisfying a visual comfort condition at the self-position of the electronic device may be built.

The light control command message may include, for example, information required to control the illuminance, color temperature, steering angle, focused area size, and the like of a target light so that the lighting environment satisfying the visual comfort condition at the self-position of the electronic device may be built. In this case, the light control command message may include a target control light list. The target control light list has been described before in relation to the operation of the server illustrated in FIG. 7, and thus will not be described herein in detail.

According to an example embodiment, if the sensed event is occurrence of an emergency, the electronic device may configure (generate) a light control command message to notify the emergency. In this case, the light control command message may include information required to control a light so as to satisfy a visual comfort condition for notifying the emergency. The visual comfort condition may be defined in a manner that enables recognition of a place and a person to which the emergency has occurred. That is, the light control command message may be configured to include information indicating at least one target light to be turned on to notify the emergency, and information defining the brightness, steering angle, illumination type, and the like of the at least one target light. In this case, the illumination type may refer to how the light is turned on, such as flickering with a predetermined periodicity.

The electronic device transmits the light control command message to the light controller in operation 518. As defined before, the light control command message may include, for example, a target control light list and information required to control the illuminance, color temperature, steering angle, focused area size, and the like of at least one target light listed in the target control light list.

The electronic device may receive a result report message from the light controller and display a light control state of the light control zone according to the received result report message on the display in operation 520.

Figure 6:
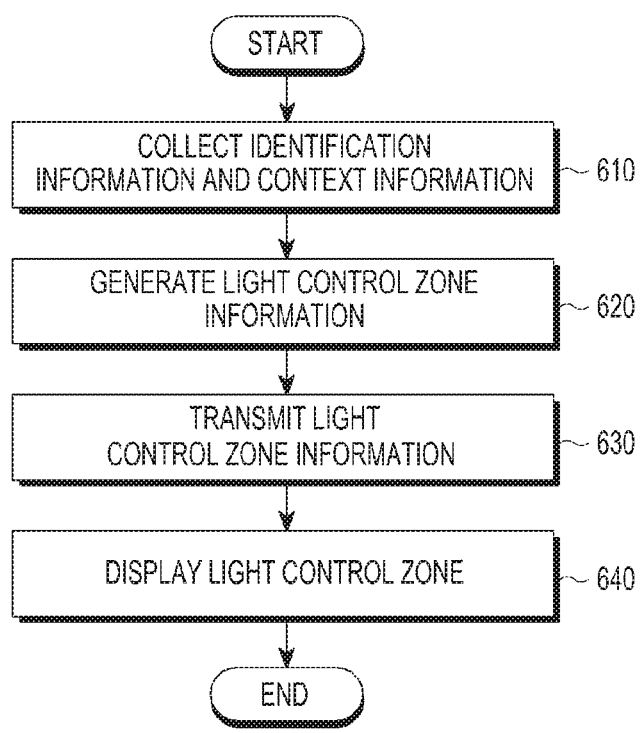
FIG. 6 is a flowchart illustrating an example operation of a server for performing light control based on a light control zone according to an example embodiment of the present disclosure.

FIG. 6 is a flowchart illustrating an example operation of a server for performing light control based on a light control zone according to an example embodiment of the present disclosure. The flowchart illustrated in FIG. 6 depicts the example operation of the server based on the light control procedure illustrated in FIG. 4.

Referring to FIG. 6, the server may collect identification information and context information on a per-electronic device (or per-user) basis in operation 610. The server may collect identification information and context information, for example, by a request message received from an electronic device corresponding to each user.

The server may configure (generate) light control zone information for the electronic device in order to satisfy a visual comfort condition corresponding to the identification information and context information which have been collected on a per-electronic device basis in operation 620. The server may, for example, configure (generate) a light control zone corresponding to the self-position of the electronic device using the identification information and context information which have been collected on a per-electronic device basis. The light control zone may be configured with at least one light required to provide a lighting environment satisfying the visual comfort condition at the self-position of the electronic device. The server may generate, change, or change the state of (activate/deactivate) light control zone information based on the configured light control zone. For example, the visual comfort condition may be a visual comfort illuminance indicating an illuminance that the electronic device wants to measure at the self-position.

According to an example embodiment, the server may determine the self-position of the electronic device based on self-position information included in the context information about the electronic device, and select lights that may affect the visual comfort condition at the determined self-position. That is, the server may determine at least one target light needed to achieve a lighting environment satisfying the visual comfort condition at the determined self-position. The server may generate a target control light list indicating the determined target light.

The server may generate or change the light control zone information so that the generated target control light list may be included in the light control zone information. For example, the target light may be a light to be turned on to achieve a visual comfort illuminance corresponding to the visual comfort condition at the self-position of the electronic device.

According to an example embodiment, the server may generate a target control light list with a minimum and/or reduced number of lights that enable measurement of an illuminance satisfying the visual comfort condition at the self-position of the electronic device.

The server may determine whether there is at least one light used overlappingly to configure another light control zone, among the at least one light listed in the target control light list, and may configure an overlap zone with the overlappingly used at least one light. In this case, the server may generate overlap zone information based on the configured overlap zone. For example, the overlap zone information may include a light list listing at least one light included in the overlap zone.

The server may include a light control zone information DB for managing light control zone information. The light control zone information DB may manage overlap zone information together with the light control zone information.

The server may further include, for example, a spatial information DB, a visual comfort condition DB, and a light control command DB. The spatial information DB may manage information about a layout, furniture arrangement, the positions of installed lights, and so on in a space for which light control may be performed. The visual comfort condition DB may manage a visual comfort condition corresponding to context information received from an electronic device. The light control command DB may manage commands for controlling turn-on or turn-off, brightness (illuminance), light color, color temperature, steering angle (illumination direction), focused area size, and the like of lights in a specific light control zone in order to satisfy a visual comfort condition for the specific light control zone.

The server may transmit the light control zone information configured for the electronic device to the electronic device in operation 630. For example, the light control zone information may be transmitted in a response message to the electronic device. The light control zone information may include a target control light list. If the light control zone includes an overlap zone, the light control zone information may further include overlap zone information. The overlap zone information may include a light list listing at least one light included in the overlap zone.

The server may display a light control zone configured for at least one electronic device on the display in operation 640. The server may determine the light control zone to be displayed on the display, based on the light control zone information provided to the electronic device. If an overlap zone is produced by light control zones configured for a plurality of electronic devices, the overlap zone may be displayed on the display in addition to the light control zone configured for each of the electronic devices.

Figure 7:
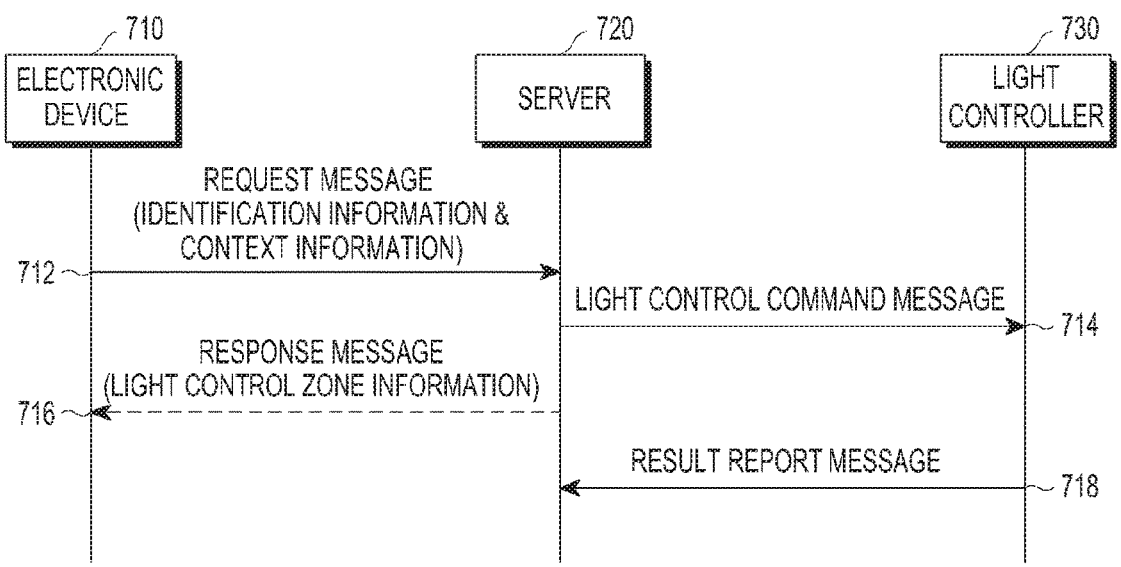
FIG. 7 is a diagram illustrating an example signal flow for a light control procedure according to another example embodiment of the present disclosure.

FIG. 7 is a diagram illustrating an example signal flow for a light control procedure according to another example embodiment of the present disclosure. The procedure illustrated in FIG. 7 is based on the assumption that a server 720 commands light control to a light controller 730. It is to be noted that the same procedure as that of FIG. 4 will not be described or will be described in brief.

Referring to FIG. 7, an electronic device 710 may transmit a request message to the server 720, and the server 720 may receive the request message from the electronic device 710 in operation 712.

The server 720 may configure a light control zone in a manner that satisfies a visual comfort condition corresponding to identification information and context information included in the received request message, and generate, change, or change the state of (activate/deactivate) light control zone information based on the configured light control zone.

The server 720 may configure (generate) a light control command message based on the light control zone information to satisfy a visual comfort condition. The light control command message requests the light controller 730 to control at least one light included in a target control light list, so that a lighting environment corresponding to the visual comfort condition may be built at the self-position of the electronic device 710. The light control command message has been defined before and thus will not be descried herein.

For example, the server 720 may preset an emergency recognition condition. Upon recognition of an emergency satisfying the preset emergency recognition condition, the server 720 may configure (generate) a light control command message to notify the recognized emergency. Configuration of the light control command message to notify the recognized emergency has been described before in detail with reference to FIG. 4.

The server 720 may transmit the light control command message to the light controller 730, and the light controller 730 may receive the light control command message from the server 720 in operation 714.

The light controller 730 may control a lighting environment of the light control zone to satisfy the visual comfort condition, based on the received light control command message, configure (generate) a result report message based on the result of the control, and transmit the configured result report message to the server 720 in operation 718.

The server 720 may receive the result report message from the light controller 730, and display the state of light control performed for the light control zone on the display according to the received result report message.

The server 720 may configure (generate) a response message including the light control zone information for the electronic device 710, and transmit the configured response message to the electronic device 710 in operation 716.

Figure 8:
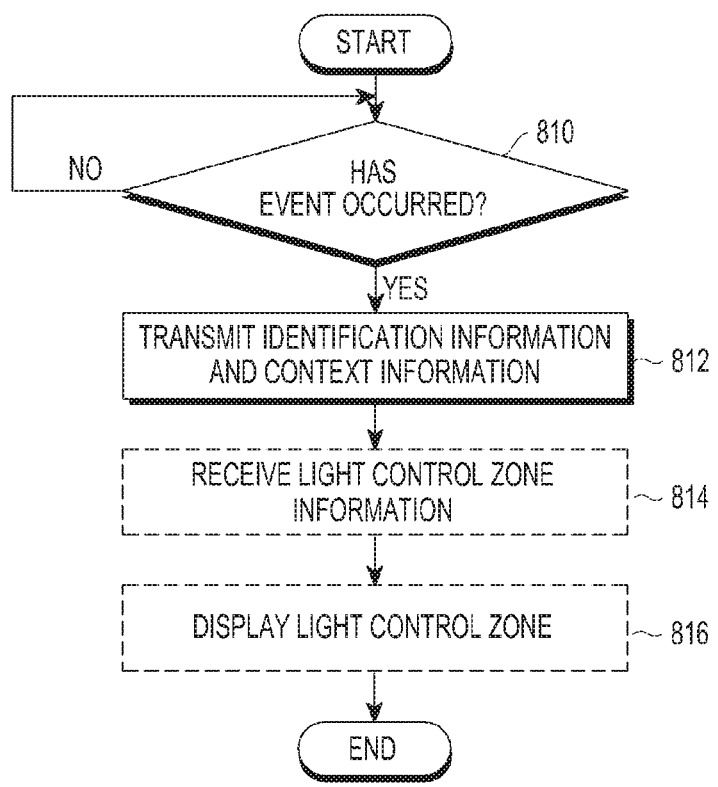
FIG. 8 is a flowchart illustrating an example operation of an electronic device for performing light control based on a light control zone according to another example embodiment of the present disclosure.

FIG. 8 is a flowchart illustrating an example operation of an electronic device for performing light control based on a light control zone according to another example embodiment of the present disclosure. The flowchart illustrated in FIG. 8 depicts the example operation of the electronic device based on the light control procedure of FIG. 7.

Referring to FIG. 8, the electronic device may monitor occurrence of an event in operation 810, and upon occurrence of an event, transmit identification information and context information to the server in operation 812. The electronic device may receive light control zone information from the server in operation 814, and display a light control zone based on the received light control zone information in operation 816.

The operation of the electronic device illustrated in FIG. 8 is performed in the same manner as the operation described with reference to FIG. 5, and thus will not be described in detail herein. However, while operations 514 and 516 of FIG. 5 are mandatory to the electronic device, operations 814 and 816 of FIG. 8 are optional to the electronic device. For example, operations 814 and 816 of FIG. 8 are not compulsory in the light control procedure illustrated in FIG. 7.

Figure 9:
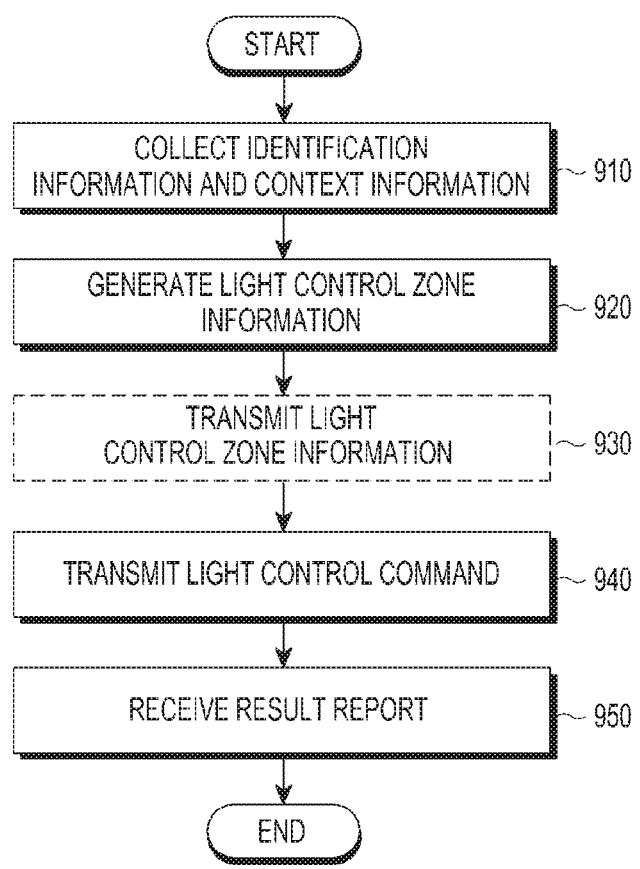
FIG. 9 is a flowchart illustrating an example operation of a server for performing light control based on a light control zone according to another example embodiment of the present disclosure.

FIG. 9 is a flowchart illustrating an example operation of a server for performing light control based on a light control zone according to another example embodiment of the present disclosure. The flowchart illustrated in FIG. 9 depicts the operation of the server based on the light control procedure illustrated in FIG. 7.

Referring to FIG. 9, the server may collect identification information and context information on a per-electronic device basis (or a per-user basis) in operation 910. The server may configure (generate) light control zone information for each electronic device based on the identification information and the context information collected for the electronic device in operation 920. The operations for collecting identification information and context information on a per-electronic device basis and configuring light control zone information based on the identification information and the context information are performed in the same manner as operations 610 and 620 of FIG. 6, and thus will not be described in detail herein.

The server may transmit the light control zone information generated for each electronic device to the electronic device in operation 930. However, the operation for transmitting light control zone information to an electronic device is not mandatory to implementation of the embodiment.

The server may configure (generate) a light control command message for the electronic device based on the light control zone information configured for the electronic device, and transmit the configured light control command message to the light controller in operation 940. The operation for configuring a light control command message and transmitting the configured light control command message to a light controller may be performed in the same manner as operation 518 performed by the electronic device in FIG. 5, except that the entities of performing operation 940 of FIG. 9 and operation 518 of FIG. 5 are different. Accordingly, the specific operation of the server in operation 940 of FIG. 9 will not be described in detail herein.

The server may receive a result report message reporting the state of light control performed for the light control zone from the light controller in operation 950. The server may display the state of light control performed for the light control zone on the display based on the received result report message.

Figure 10:
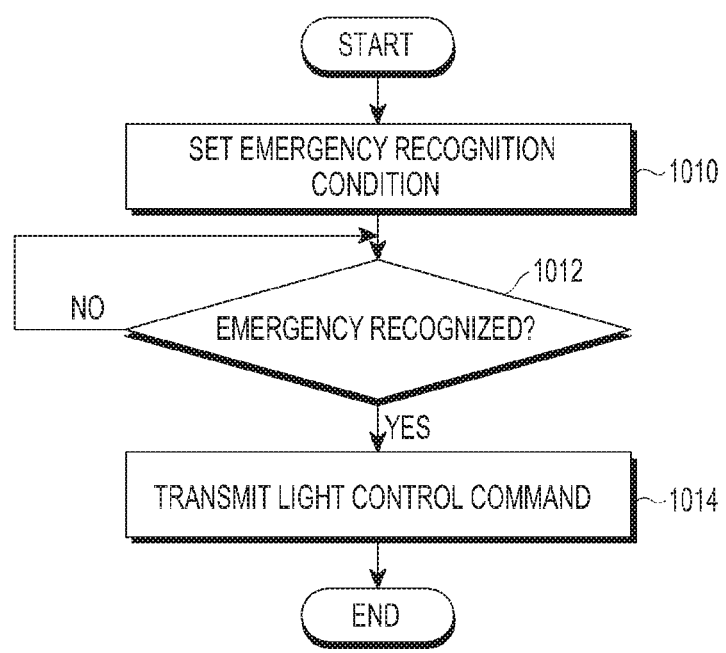
FIG. 10 is a flowchart illustrating an example operation of an electronic device or a server for performing light control, upon occurrence of an emergency according to an example embodiment of the present disclosure.

FIG. 10 is a flowchart illustrating an example operation of an electronic device or a server for performing light control, upon occurrence of an emergency according to an example embodiment of the present disclosure. For the convenience of description, it is assumed that the operation of FIG. 10 is performed by the electronic device, although it may be performed in the same manner by the server.

Referring to FIG. 10, the electronic device may set an emergency recognition condition to recognize occurrence of an emergency in operation 1010. The emergency recognition condition may be set, for example, by a direct user input or by an external device through a network.

The electronic device may monitor occurrence of an emergency based on the preset emergency recognition condition in operation 1012. For example, the electronic device may check the health state of a user. If the health state satisfies the preset emergency recognition condition, the electronic device may determine that an emergency has occurred. In this case, the electronic device may be a wearable device.

For example, if the user is swimming with the electronic device worn on the user, the electronic device may check the movement, pulses, breathing, and so on of the user, and determine whether an emergency has occurred to the user based on the check. If the movement of the user does not match to a normal action for swimming, the electronic device may determine that an emergency has occurred. If the pulses are outside a normal pulse range for swimming, the electronic device may determine that an emergency has occurred. However, this example is not limited to specific activities of the user. That is, the same thing may be applied to everyday activities of the user.

In another example, if the user lies on a hospital bed, wearing the electronic device, the electronic device may check the motion, pulses, breathing, oxygen saturation, and/or the like of the user, and determine whether an emergency has occurred based on the check. For example, if the pulses, oxygen saturation, or breathing of the user is outside a preset normal range, the electronic device may determine that an emergency has occurred.

In another example, if the electronic device is mounted in a vehicle, the electronic device may check the movement, velocity, revolution per minute (RPM), impact, and/or the like of the vehicle, and determine whether an emergency has occurred based on the check. For example, if the velocity or RPM of the vehicle is outside a preset normal range, the electronic device may determine that an emergency has occurred. Further, if an external impact on the vehicle is outside a preset normal range, the electronic device may determine that an emergency has occurred.

Upon recognition of occurrence of an emergency, the electronic device may transmit a light control command to the light controller in order to notify occurrence of the emergency in operation 1014. In this case, the electronic device may provide the light controller with light control information configured based on a visual comfort condition preset to build a lighting environment that notifies an emergency in the light control zone. The light control information may be, for example, information for controlling the illuminance, color temperature, steering angle, illumination type, focused area size, and/or the like of lights included in the light control zone, so that which nearby persons may readily perceive a place and a person to which the emergency has occurred. The illumination type may refer to how a light is turned on, such as flickering with a predetermined periodicity.

Figure 11A:
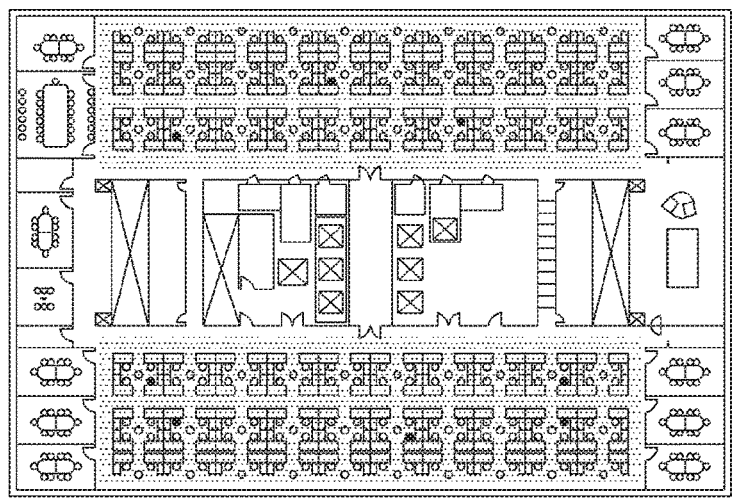
FIGS. 11A, 11B and 11C are diagrams illustrating example light control when a user goes to work according to an example embodiment of the present disclosure.
Figure 11B:
Figure 11B:
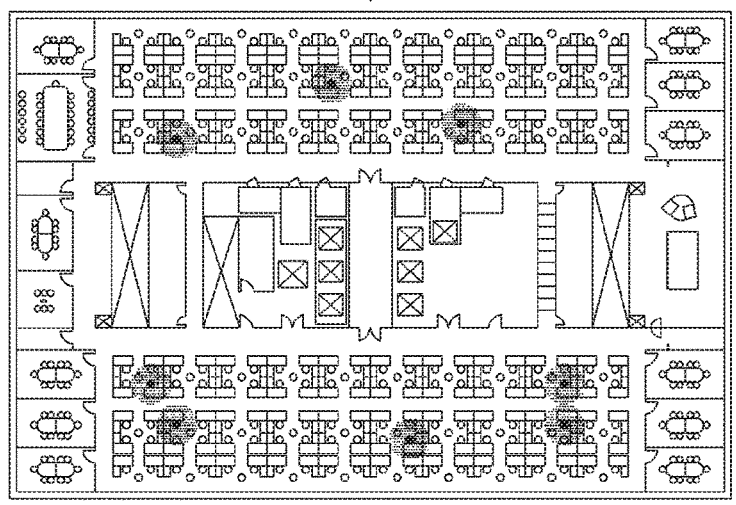
Figure 11C:
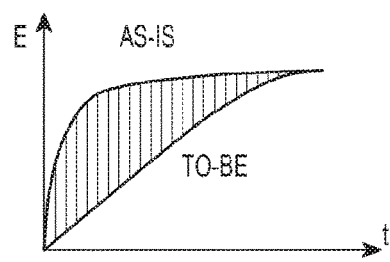

FIGS. 11A, 11B and 11C are diagrams illustrating example light control when a user goes to work according to an example embodiment of the present disclosure.

Referring to FIGS. 11A-11C, conventionally, all lights installed in one open space are turned on at the same time irrespective of the number of present persons in the space (refer to FIG. 11A). on the other hand, according to an example embodiment, light control zones may be configured and light control may be performed based on the light control zones, so that lighting environments satisfying visual comfort conditions may be built for the persons present in the space according to their positions (refer to FIG. 11B). Therefore, while a lighting environment adapted to each person is provided, unnecessary energy consumption may be prevented and/or reduced (refer to FIG. 11C).

Figure 12A:
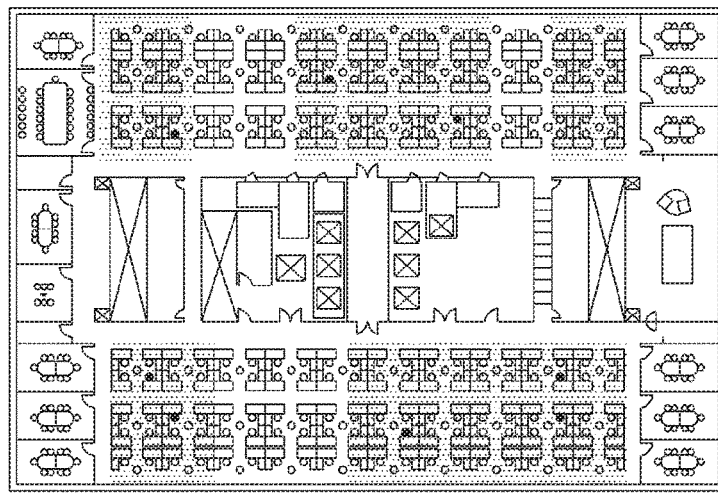
FIGS. 12A, 12B and 12C are diagrams illustrating example light control when a user leaves work according to an example embodiment of the present disclosure.
Figure 12B:
Figure 12B:
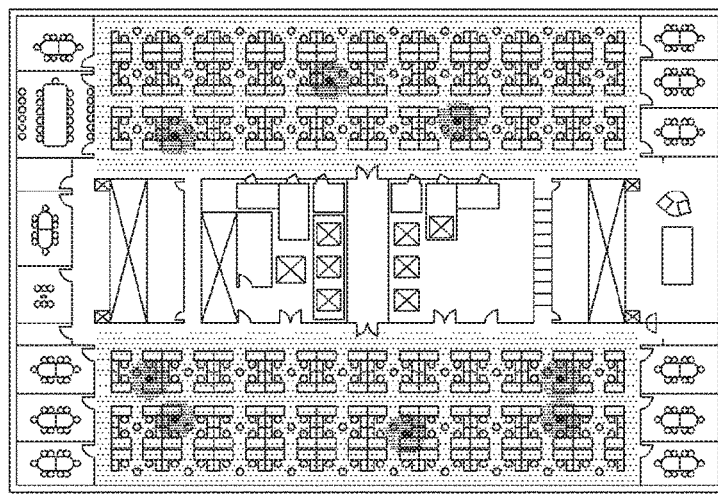
Figure 12C:
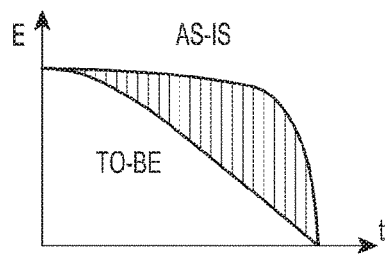

FIGS. 12A, 12B and 12C are diagrams illustrating example light control when a user leaves work according to an example embodiment of the present disclosure.

Referring to FIGS. 12A-12C, conventionally, it may be difficult to provide a lighting environment in consideration of the visual comfort of persons at work after a closing time, or unnecessary energy consumption may occur in providing the lighting environment (refer to FIG. 12A). On the other hand, according to an example embodiment, light control zones may be configured and light control may be performed based on the light control zones, so that lighting environments satisfying visual comfort conditions may be built for persons working after a closing time (refer to FIG. 12B). Therefore, while a lighting environment adapted to each person is provided, unnecessary energy consumption may be prevented and/or reduced (refer to FIG. 12C).

Figure 13A:
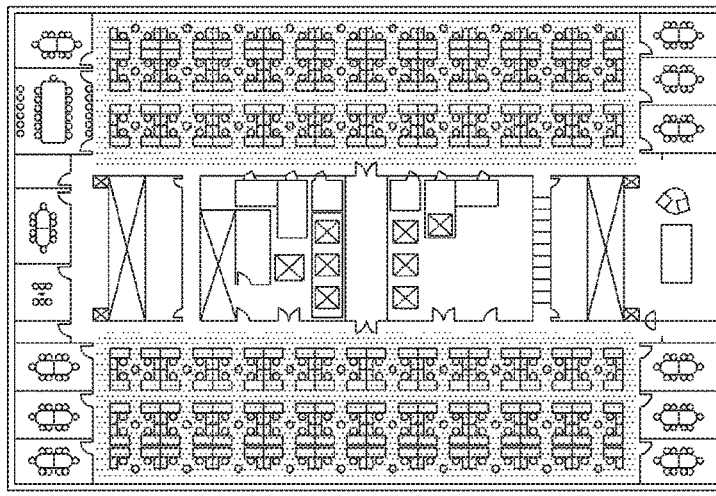
FIGS. 13A, 13B and 13C are diagrams illustrating example light control when a user is absent according to an example embodiment of the present disclosure.
Figure 13B:
Figure 13B:
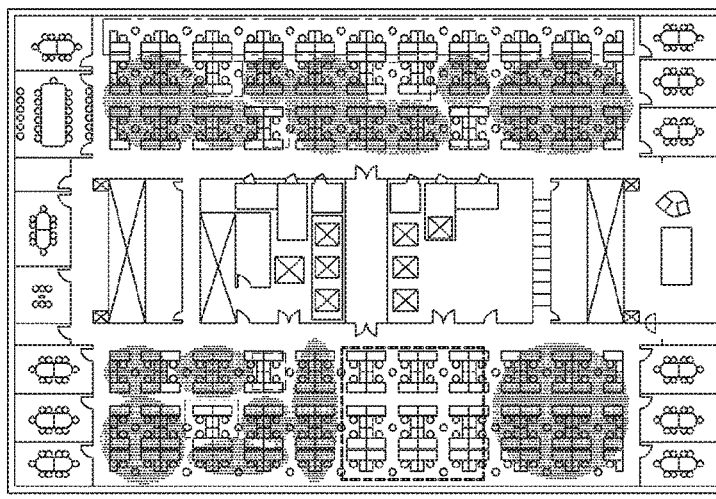
Figure 13C:
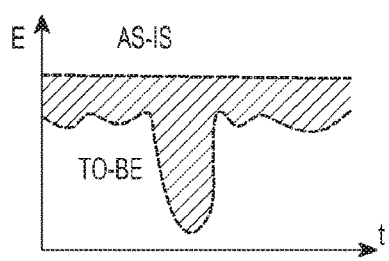

FIGS. 13A, 13B and 13C are diagrams illustrating example light control when a user is absent according to an example embodiment of the present disclosure.

Referring to FIGS. 13A-13C, conventionally, it may be noted that even when persons are absent for rest or group activities, all lights installed in one open space are turned on (refer to FIG. 13A). On the other hand, according to an example embodiment, light control zones may be configured and light control may be performed based on the light control zones, so that a lighting environment satisfying a visual comfort condition may be built for each remaining person, when other persons are absent for rest or group activities (refer to FIG. 13B). In this case, light control may be performed more efficiently in consideration of the illuminance of each position lighted with natural light. Further, it may be noted that there is an overlap zone between some light control zones. Therefore, while a lighting environment adapted to each remaining person is provided despite the absence of other persons for rest or group activities, unnecessary energy consumption may be prevented and/or reduced (refer to FIG. 13C).

Figure 14A:
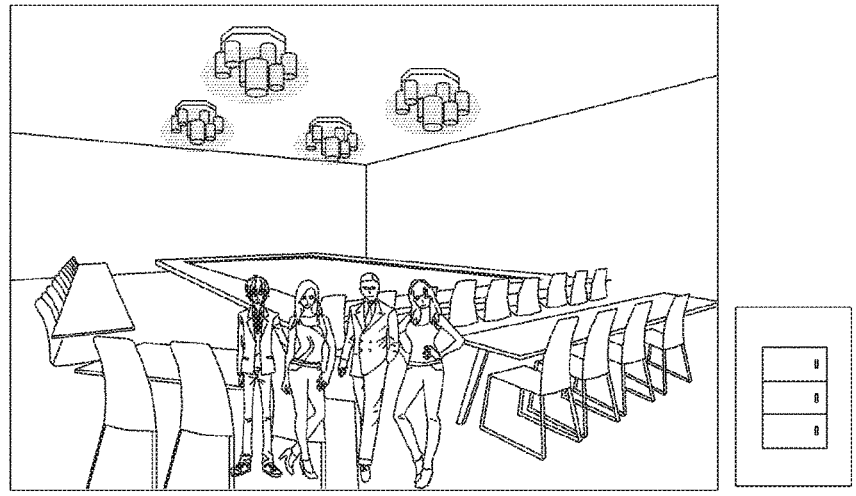
FIGS. 14A, 14B and 14C are diagrams illustrating example light control in consideration of a user position in an open space according to an example embodiment of the present disclosure.
Figure 14B:
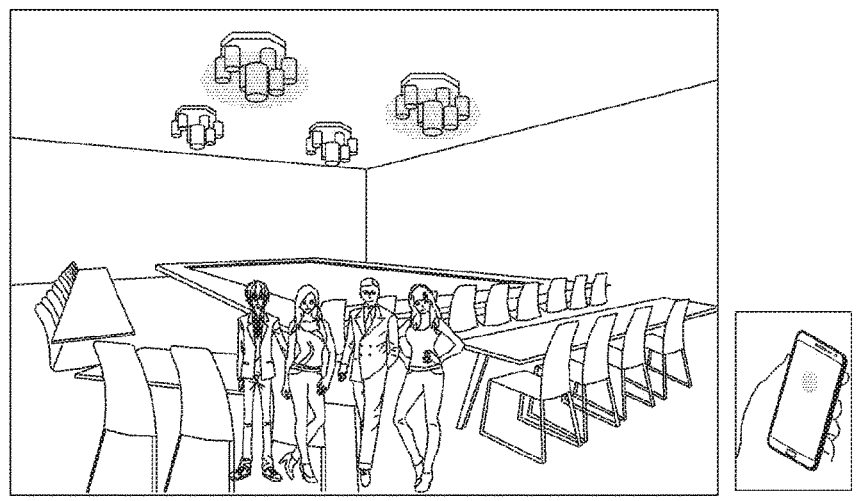
Figure 14C:
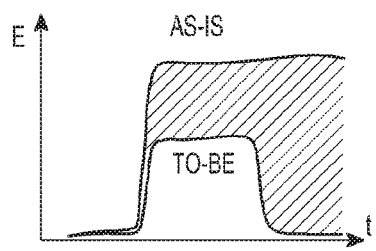

FIGS. 14A, 14B and 14C are diagrams illustrating example light control in consideration of user positions in an open space according to an example embodiment of the present disclosure.

Referring to FIGS. 14A-14C, when a user uses a part of an open space, all lights in the space are conventionally turned on, thereby causing energy loss (refer to FIG. 14A). On the other hand, in an example embodiment, if a user uses a part of an open space, a light control zone is configured to satisfy a visual comfort condition in the partial space that the user uses, and light control is performed to provide a lighting environment satisfying a visual comfort condition in the light control zone (refer to FIG. 14B). Therefore, unnecessary energy consumption can be prevented and/or reduced by providing an optimal lighting environment for the space that the user substantially uses (refer to FIG. 14C).

The light control examples illustrated in FIGS. 11A to 14C may be example UIs of a server, in which a plurality of light control zones are displayed in one space (a map or a per-floor structure of a building). For example, the light control examples may be example UIs in which light control zone information is inserted in spatial information.

Figure 15A:
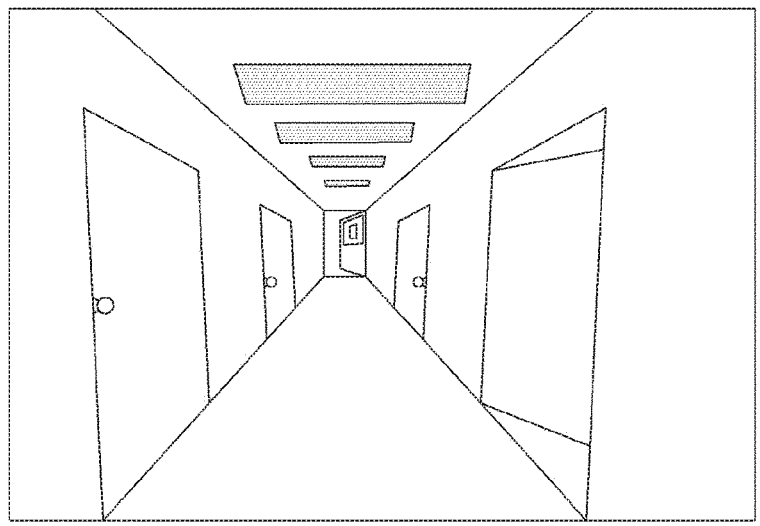
FIGS. 15A, 15B and 15C are diagrams illustrating example light control in consideration of the presence or absence of any user according to an example embodiment of the present disclosure.
Figure 15B:
Figure 15B:
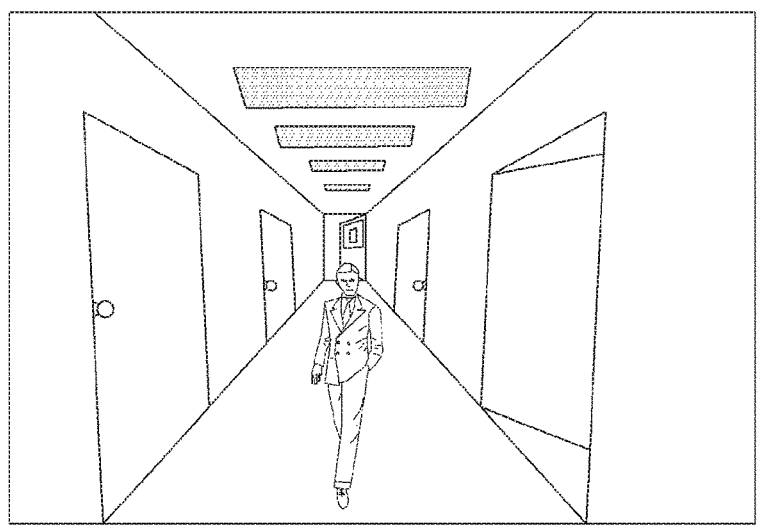
Figure 15C:
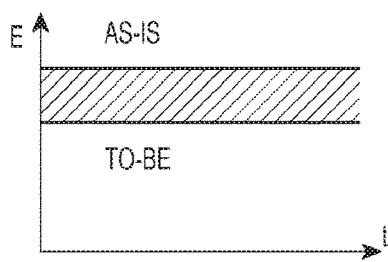

FIGS. 15A, 15B and 15C are diagrams illustrating example light control in consideration of the presence or absence of a user in an open space according to an example embodiment of the present disclosure.

Referring to FIGS. 15A-15C, conventionally, lights in a specific space are always turned on irrespective of the presence or absence of a user, thereby causing unnecessary energy consumption (refer to FIG. 15A). on the other hand, in an example embodiment, a light control zone to be turned on is configured based on the presence or absence of a user. Only when a user enters the configured light control zone, lights of the light control zone are turned on (refer to FIG. 15B). Therefore, unnecessary energy consumption can be prevented and/or reduced by providing illumination only when needed (refer to FIG. 15C).

Figure 16:
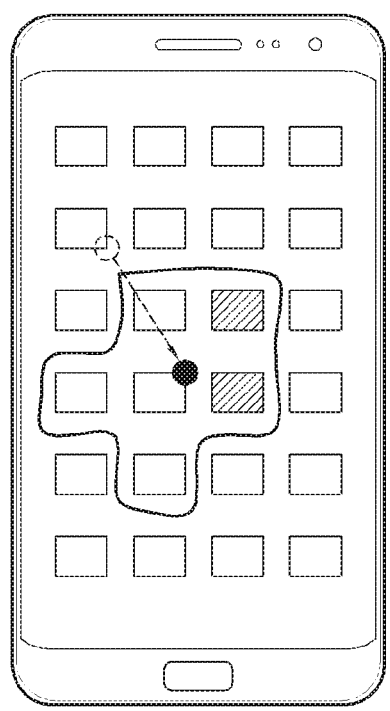
FIG. 16 is a diagram illustrating an example user interface (UI) related to light control in an electronic device according to an example embodiment of the present disclosure.

FIG. 16 is a diagram illustrating an example UI related to light control in an electronic device according to an example embodiment of the present disclosure.

Referring to FIG. 16, when a user moves, a light control zone (my zone) may be configured with a minimum and/or reduced number of lights that are detected as providing a lighting environment satisfying a visual comfort condition by turning on lights in order of proximity to the moved position of the user one by one, so that the lighting environment satisfying the visual comfort condition may be provided at the moved position of the user. A part of the lights of the configured light control zone may also be included in another light control zone. That is, some lights in the configured light control zone may be configured as an overlap zone.

According to various example embodiments of the present disclosure, the server may configure a light control zone with a minimum number of lights that are detected as providing a lighting environment satisfying a visual comfort condition at each user position, based on user position information estimated according to illuminance information and a wireless signal. An area over which a plurality of light control zones are overlapped may be configured as an overlap zone.

According to an example embodiment, each light control zone may be configured for one or more users based on the layout of lights in a specific single open space (a space in which a light control zone is to be configured). For example, a minimum and/or reduced number of lights satisfying a target visual comfort condition for the position of a user may be selected and configured as a light control zone. The lights may be laid out in the shape of a circle, a triangle, a square, a star, or the like in the light control zone. In the presence of a plurality of electronic devices in the specific space, an overlap zone may be configured due to light control zones configured for the plurality of electronic devices. For example, the overlap zone may be configured with at least one light overlapped between the light control zones of the plurality of users.

According to various example embodiments of the present disclosure, the server may perform light control for a light control zone configured at each user position by adjusting at least one of turn-on or turn-off, brightness, color temperature, and direction of each of the lights of the light control zone according to the presence or absence of a user. The server may configure an area in which the presence or absence of a user is determined, in consideration of an indoor positioning system (IPS) error in the light control zone configured at the individual user position.

According to an embodiment, light control may be performed to achieve a target illuminance (an illuminance satisfying a visual comfort condition for a user) at a specific reference point of a predetermined or updated light control zone. For example, light control for a target light control zone may include a series of operations for achieving a target illuminance satisfying a visual comfort condition at a specific reference point (the position of a user) by turning on lights or adjusting the brightness, color temperature, direction, or the like of lights in order of proximity to the specific reference point among lights installed in the target control zone. In another example, if the target light control zone includes an overlap zone, light control for a target light control zone may include a series of operations for achieving a target illuminance satisfying a visual comfort condition at a specific reference point (the position of a user) by turning on lights or adjusting the brightness, color temperature, direction, or the like of lights in order of proximity to a specific reference point (the overlap zone) among lights installed in the target control zone.

According to an example embodiment, the presence or absence of any user in a light control zone of an open space may be monitored, and a light may be controlled based on the monitoring result not to impair the visual comfort of nearby users. For example, the density (the number of users, distances between the users, and the like) of a specific space in an open space in which a plurality of users may be located may be monitored, and a light control zone may be configured and light control may be changed according to the monitored density. That is, turn-on/off and brightness of lights may be controlled for a per-user light control zone with respect to an overlap zone related to the visual comfort of a plurality of users. For the open space, light control may be configured in consideration of a working schedule (a lunch time, a closing time, and the like). For example, lights may be turned off or their brightness may be reduced at the lunch time or after the closing time.

According to an example embodiment, if a user leaves an environment in which there is an overlap zone between a plurality of light controls zones, light control may be performed in a manner that prevents sudden turn-off of a light control zone for the user and maintains visual comfort for the other users.

According to an example embodiment, the server may change the size, shape, light brightness, or the like of a light control zone for a user in consideration of context information about the user in terms of preference, activity, or the like.

According to various example embodiments of the present disclosure, the server may grant a light control authority for a specific light control zone to an electronic device such as a user terminal. Then, the electronic device may perform a series of operations for controlling a lighting environment of the specific light control zone. In this case, a zone controllable by the electronic device does not always need to match to a predetermined light control zone. For example, the zone controllable by the electronic device may be configured newly with lights that affect an illuminance at the position of the user within the predetermined light control zone.

According to an example embodiment, the electronic device may control turn-on, turn-off, flickering, brightness, color temperature, direction, or the like of all or a part of lights in a target light control zone in a manner preset based on the health state, behavior, requirements, or the like of the user.

For example, the electronic device may be a wearable device such as a smart band. Upon sensing an abnormality in the health state (heart rate, oxygen saturation, or the like) of a user in a swimming pool, a hospital room, or the like, the electronic device may determine a target light control zone with respect to a reference point being the position of the electronic device (the user), and notify occurrence of an emergency by controlling all or a part of lights in the light control zone. For example, light control may be performed so that the user position may be focused.

In another example embodiment, upon sensing occurrence of a fire due to a temperature change or the like, the electronic device may notify occurrence of the fire by controlling all or a part of lights in a target light control zone with respect to the position of the electronic device.

In another example embodiment, upon receipt of an accident occurrence notification request from the user, the electronic device may notify occurrence of an accident and the position of the accident by controlling at least one street lamp near to the position of the electronic device.

In another example embodiment, occupancy may be monitored for a space in which users come and go frequently over time, for example, tables of a restaurant, and a service such as seat guiding may be readily provided by controlling an empty table and an occupied table differently. For example, a focusing light may be provided to the empty table, whereas a mood light may be provided to the occupied table.

In another example embodiment, the position of an electronic device (a user terminal) in a retailer/show room may be monitored, and a light for a user-preferred product may be controlled so that the user may readily recognize the position of the preferred product. For example, if the user is near to the preferred product, a focusing light may be provided to the preferred product.

In another example embodiment, lights in a hotel room may be controlled in consideration of preferred time information (a rising time, a bed time, or the like), so that a customer may adjust to a time difference in the hotel room.

In another example embodiment, a specific section light zone may be configured in a predetermined space (a warehouse, a facility line, or the like) of a factory, the presence or absence of a user in the configured specific section light zone may be monitored, and lights of the predetermined space may be controlled according to the monitoring result.

In another example embodiment, the position and activity of each user may be monitored in a living room having an environment in which a plurality of users may be located, a plurality of light control zones may be configured in the living room, and light control may be performed independently for each light control zone, so that visual comfort may be provided in consideration of the monitored user activities. For example, a light control zone for a first user sitting on a massager chair may be controlled to be dark, whereas a light control zone for a second user viewing TV on a couch may be controlled to be relatively bright.

In another example embodiment, the movement of a user in a kitchen may be monitored. If it is sensed that the user is cooking, light control may be performed for a light control zone configured for a cooking area corresponding to the cooking so that the user may easily check a cooking state. For example, if the user is cooking at a gas oven, light control may be performed by providing a spot light to enable the user to easily check the color of cooked food.

Besides, a change in smell, temperature, or sound in the kitchen may be monitored, a change in the cooking state may be determined based on the monitoring, and light control may be performed for a light control zone in which the event has occurred in the kitchen. For example, if a burning smell, water boiling, or the like is sensed, light control may be performed by flickering a spot light or a light so that the user may recognize the event.

In another example embodiment, the number, positions, and eating activity of persons at table in an environment in which a plurality of users may be located may be sensed, and light control may be performed for a light control zone around the table, to thereby provide an appropriate atmosphere according to the sensed number and positions of the persons. For example, an incandescent light may be turned on or a light color may be controlled to be close to that of an incandescent light.

In another example embodiment, the gazes of students may be monitored during test in a lecture room, and a light may be focused or flickered at the position of a specific student highly suspicious of cheating based on the monitoring result in a light control zone, so that the position of the specific student may be easily perceived.

In another example embodiment, if an abnormality (breakage) is sensed in a specific facility in a factory facility line, light control may be performed for a light control zone near to the sensed facility, so that the abnormality may be readily perceived.

In another example embodiment, occupancy of parking areas may be monitored in a parking lot, and light control may be performed for light control zones so that an empty parking area may be identified. Further, light control may be performed for a light control zone in the flow of movement (movement route) of a user after the user parks a car in order to prevent a crime. For example, lights in the movement route may be controlled to be bright, and if there is a nearby person, a light in an area corresponding to the nearby person may be turned on so that the nearby person may be easily perceived.

In another example embodiment, if a fall of a passenger on a railway is sensed in a subway platform, light control may be performed for a light control zone near to the fall accident, so that the occurrence and position of the accident may be easily perceived.

In the foregoing example scenarios, light control of an electronic device may be performed by changing or adjusting turn-on or turn-off, a brightness, a light color, a color temperature, a steering angle (direction), a focused area size, and so on of lights. The focused area size may be controlled based on spot lighting, uniform brightness, group lighting, or the like.

In the above-described procedure for configuring a light control zone and performing light control, a reference point may be fixed or variable. For example, when a light control zone is configured, a plurality of fixed reference points may be set in a specific space, and a reference point may be set in correspondence with movement of a user in the specific space during light control.

Figure 17:
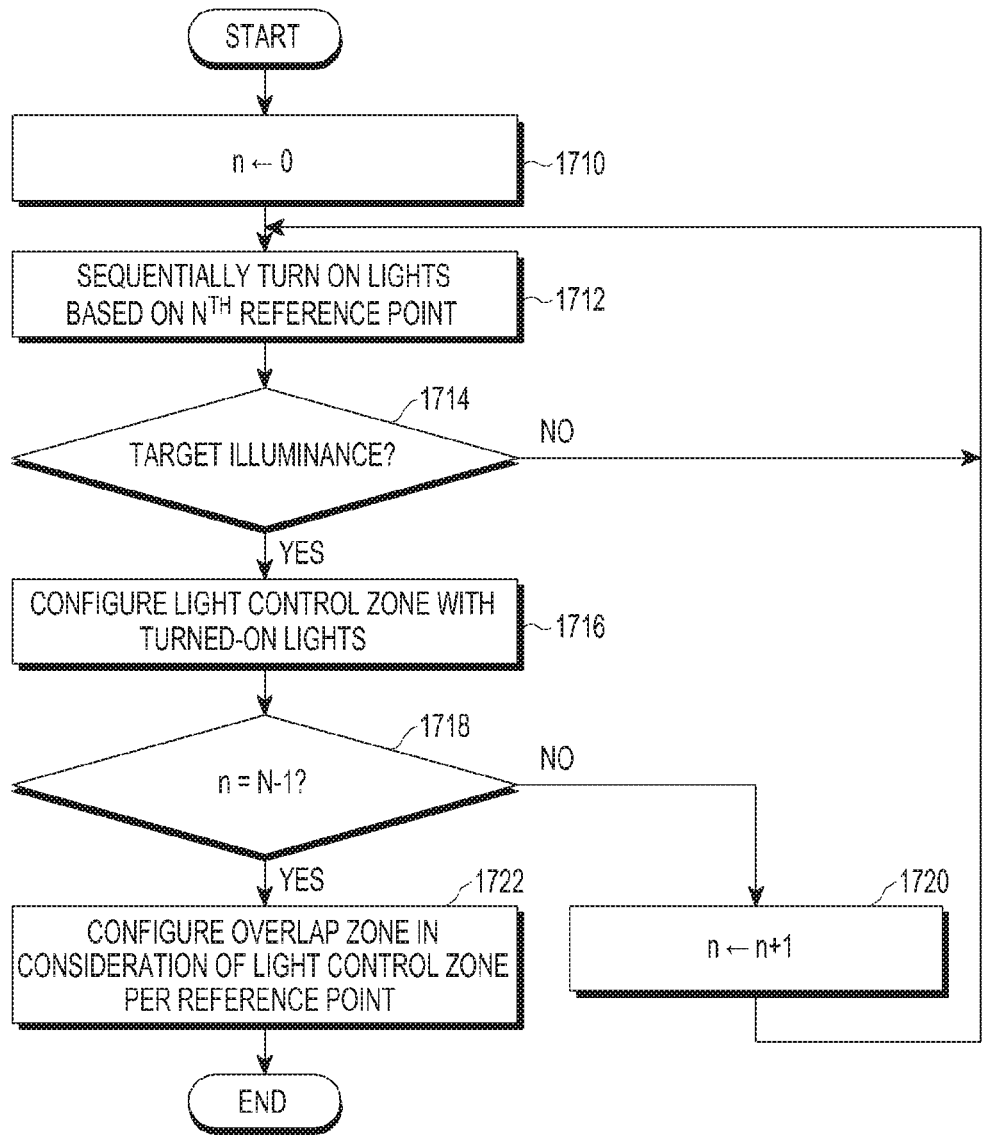
FIG. 17 is a flowchart illustrating an example operation of a server for configuring a light control zone according to various example embodiments of the present disclosure.

FIG. 17 is a flowchart illustrating an example control operation of a server for configuring a light control zone according to various example embodiments of the present disclosure.

Referring to FIG. 17, a controller sets an index n to an initial value of 0, for sequential selection of total reference points in a whole area for light control. The initialization may amount to an operation for setting n to 0 to select the first of the reference points. In operations 1718 through 1720, n may sequentially select the next reference point until light control zones are configured for all of the reference points.

In operation 1712, the controller may sequentially turn on surrounding lights that may affect an illuminance at reference point n (an $n^{th}$ reference point). The controller may determine whether the illuminance measured at reference point n has reached a target illuminance, each time one light is additionally turned on in operation 1714. Therefore, the controller may determine lights to be turned on in order to achieve the target illuminance at reference point n in operations 1712 and 1714. Once the lights to be turned on in order to achieve the target illuminance at reference point n are determined, the controller may configure a light control zone corresponding to reference point n with the determined lights in operation 1716.

While not shown, the controller may consider the brightness of a light as well as turn-on of the light to achieve the target illuminance at reference point n. When the controller configures a light control zone, it may additionally store brightness information about lights included in the light control zone. If the controller configures a light control zone in consideration of the brightness of lights, the light control zone may be configured with different lights.

After configuring the light control zone for one reference point, the controller may select the next reference point in operations 1718 and 1720, and configure a light control zone for the selected reference point in operations 1712 and 1714.

As described above, upon completion of configuring a light control zone for each of the reference points, the controller may determine whether each light control zone includes an overlap zone, and configure an overlap zone based on the determination in operation 1722. The overlap zone may be configured with at least one light included commonly in a plurality of light control zones. However, if a light control zone is configured dynamically, there may not exist a need for pre-configuring an overlap zone.

Figure 18:
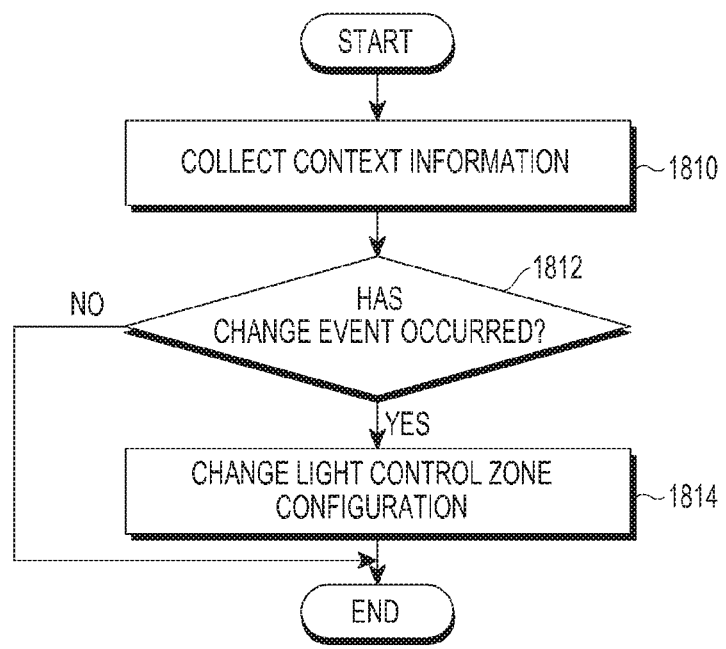
FIG. 18 is a flowchart illustrating an example operation of a server for updating a light control zone according to various example embodiments of the present disclosure.

FIG. 18 is a flowchart illustrating an example operation of a server for updating a light control zone according to various example embodiments of the present disclosure.

Referring to FIG. 18, a controller may collect context information for use in determining whether an already configured light control zone needs to be updated in operation 1810. For example, the context information may be user context information which may include information about the position of a user, information about a pattern in which the user uses surrounding devices, and sensing information from, for example, an inertial sensor (an accelerometer sensor, a GPS sensor, a gyro sensor, or the like) of an electronic device. The controller may predict information about the movement frequency and movement range of the user based on the context information.

In operation 1812, the controller may determine whether an event requiring change of the light control zone has occurred by analyzing the collected context information. The occurrence of an event means that the light control zone configured for a specific reference point needs to be updated due to a change in a situation in which the light control zone should provide illumination. For example, although the light control zone was configured in consideration of the user's working at a fixed position, if the user moves frequently, it may be preferable to change the light control zone in consideration of the movement of the user.

Upon occurrence of an event triggering change of the light control zone, a procedure for changing lights included in the light control zone to be changed may be performed in operation 1814. For example, the light control zone configuration may be changed in the operation described before with reference to FIG. 17. In this case, however, a light control zone may be only configured for the reference point corresponding to the light control zone to be changed.

Figure 19:
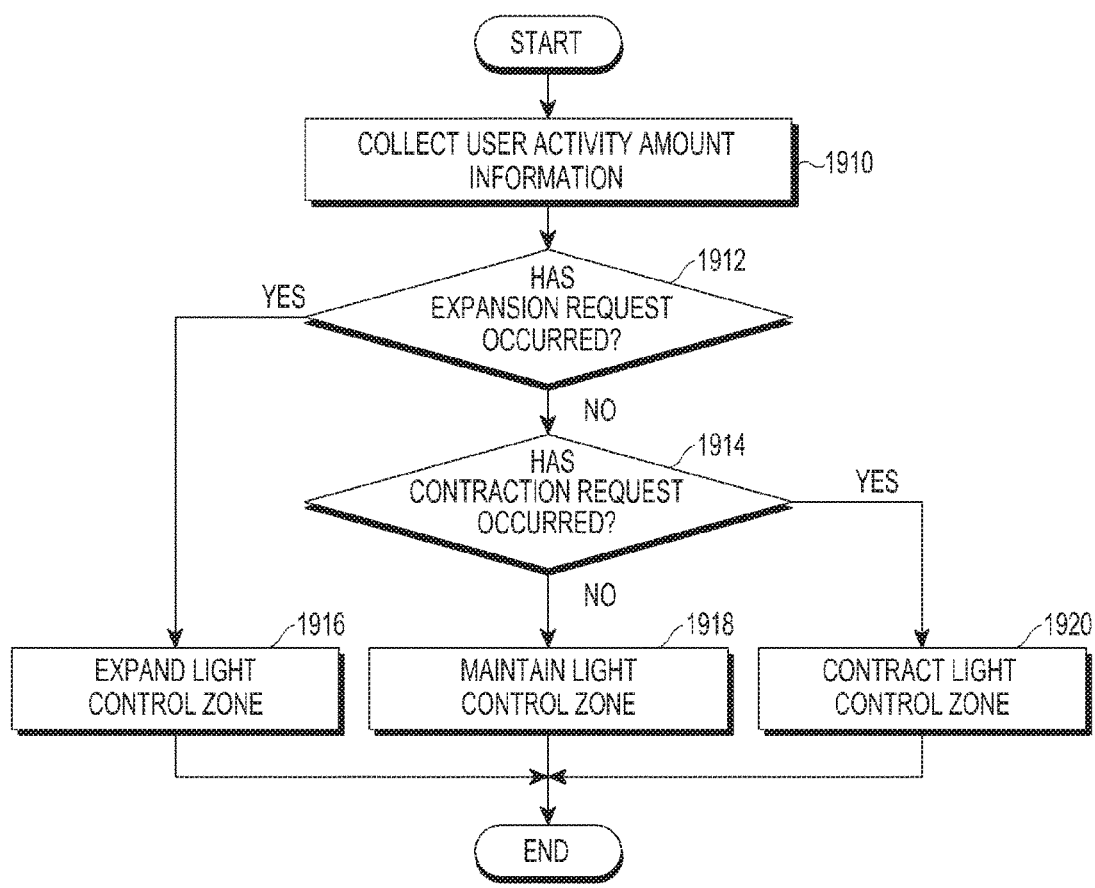
FIG. 19 is a flowchart illustrating an implementation example of an operation of a server for updating a light control zone according to various example embodiments of the present disclosure.

FIG. 19 is a flowchart illustrating an implementation example of an operation of a server for updating a light control zone according to various example embodiments of the present disclosure.

Referring to FIG. 19, a controller may collect activity amount information about an electronic device (a user terminal or the like) in operation 1910. The activity amount information may include information about the movement frequency, movement range, or the like of a user sensed by at least one sensor (an accelerometer sensor, a GPS sensor, a gyro sensor, or the like) included in the electronic device.

The controller may determine whether to expand a target light control zone by analyzing the collected activity amount information in operation 1912, or whether to contract the target light control zone by analyzing the collected activity amount information in operation 1914. For example, if an activity score acquired by analyzing the collected activity amount information is equal to or larger than a predetermined threshold for zone expansion, the controller may determine that an expansion request has been generated. If the activity score acquired by analyzing the collected activity amount information is equal to or less than a predetermined threshold for contraction, the controller may determine that a contraction request has been generated.

Upon generation of the expansion request, the controller may perform a procedure for expanding the target light control zone in operation 1916. On the other hand, upon generation of the contraction request, the controller may perform a procedure for contracting the target light control zone in operation 1920. If either the expansion request or the contraction request has not been generated, the controller may maintain the target light control zone unchanged in operation 1918. For example, the light control zone may be expanded by adding at least one new light in the light control zone, and contracted by removing at least one existing light in the light control zone. Meanwhile, the light control zone may be expanded by removing at least one existing light and adding more new lights than the number of the removed lights in the light control zone, and contracted by removing at least one existing light and adding fewer new lights than the number of the removed lights in the light control zone. For example, the controller may add a new light to the light control zone by performing an operation in the procedure of FIG. 17.

In the foregoing example embodiment, it is proposed that a light control zone is configured for each electronic device and light control is performed based on the light control zone. However, to increase visual comfort in the surroundings instead of saving energy, a light control zone may be configured on a group basis (on a small part basis), and light control may be performed based on the light control zone. In the case where all lights of the light control zone are turned off only in the absence of all members of the group, if at least one electronic device of the group exists, the lights of the light control zone may be turned on.

Figure 20:
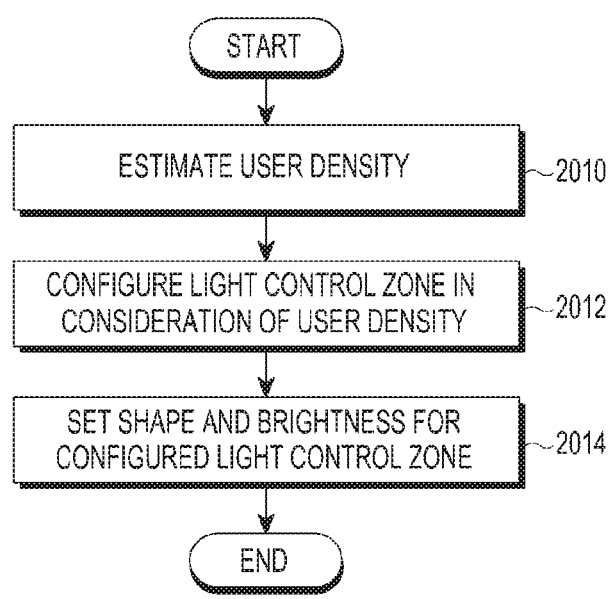
FIG. 20 is a flowchart illustrating an implementation example of light control according to various example embodiments of the present disclosure.

FIG. 20 is a flowchart illustrating an implementation example of light control according to various example embodiments of the present disclosure.

Referring to FIG. 20, the controller may measure the density of users in operation 2010. The user density may refer, for example, to the number of electronic devices (user terminals or the like) located in a space (a smaller area than a light control zone, set to determine how densely electronic devices are populated). The user density may be used indirectly instead of distances between the electronic devices. For example, the user density may be estimated based on position information about each electronic device (user terminal or the like).

The controller may configure a light control zone in consideration of the estimated user density in operation 2012. For example, the controller may select lights to be included in a light control zone in proportion to the density. In operation 2014, the controller may set the shape of the light control zone and the brightness of each light in the light control zone. For example, the light control zone may be circular, star-shaped, square, diamond-shaped, or the like. Besides, the controller may additionally perform configuration for controlling a light color, an illumination type, a color temperature, a steering angle, a focusing level, or the like.

Figure 21:
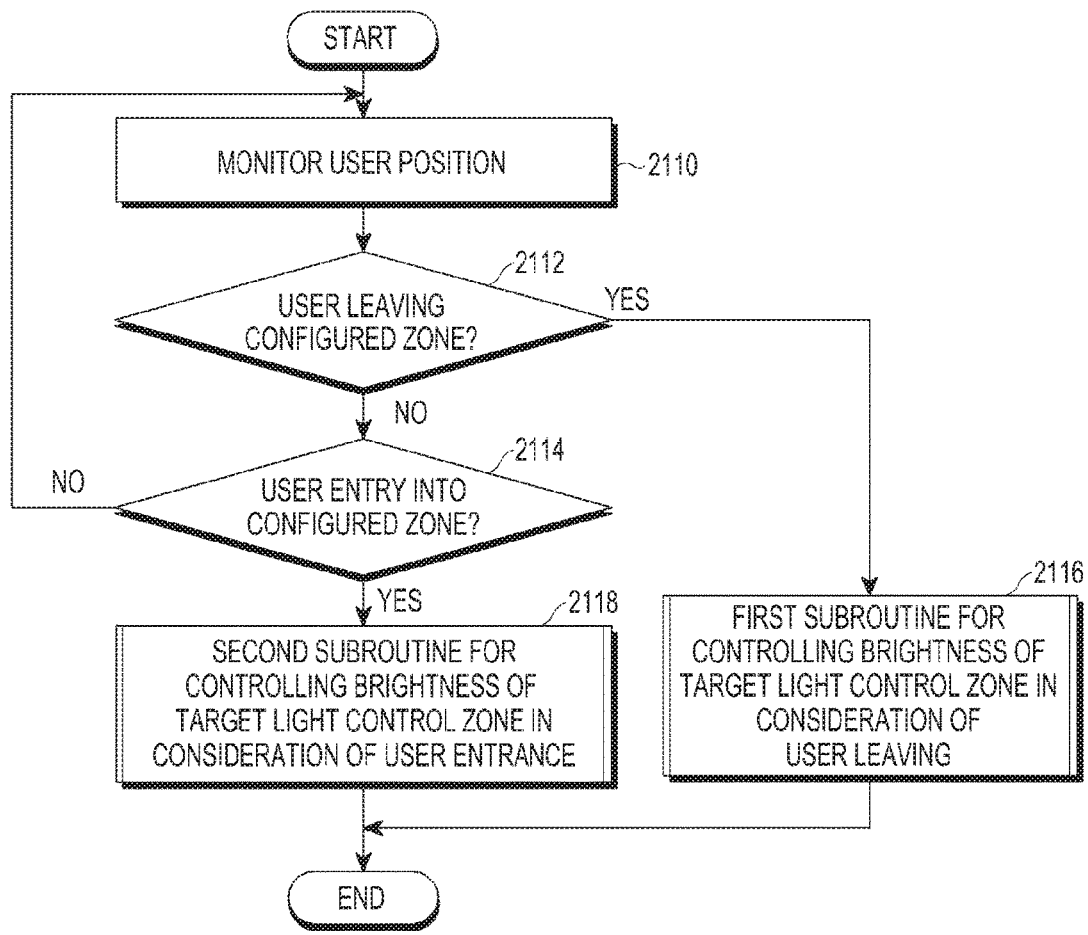
FIG. 21 is a flowchart illustrating another implementation example of light control according to various example embodiments of the present disclosure.

FIG. 21 is a flowchart illustrating another implementation example of light control according to various example embodiments of the present disclosure.

Referring to FIG. 21, the controller may receive a report of position information from an electronic device, and monitor the position of the electronic device based on the reported position information in operation 2110. The controller determines whether the electronic device has moved out of a configured area or entered the configured area in operations 2112 and 2114. The configured area may be a light control zone or an area expanded from a light control zone in additional consideration of IPS.

Figure 22:
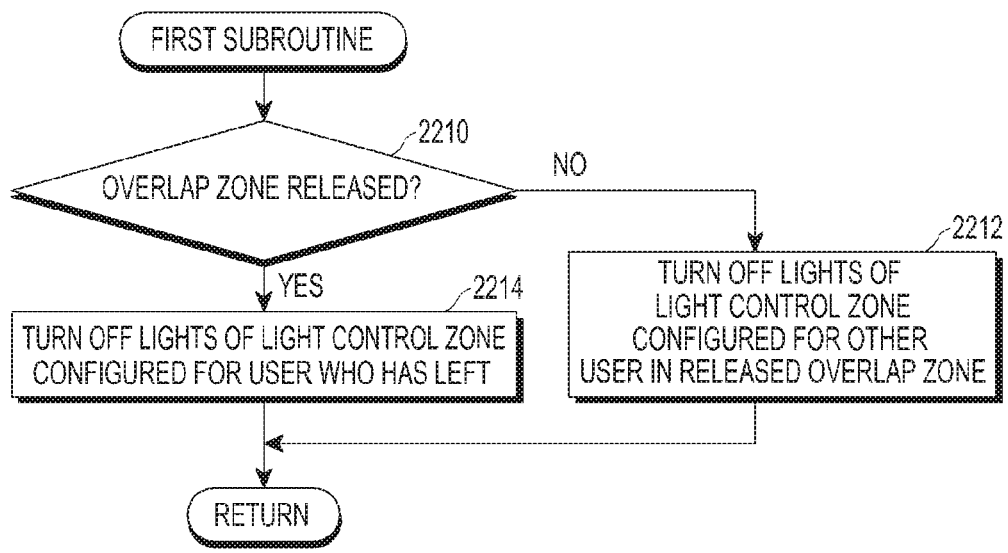
FIG. 22 is a flowchart illustrating an example subroutine for light control when a user leaves from a zone in the flowchart of FIG. 21.

Upon sensing that the electronic device has left the configured area, the controller may perform a first subroutine for controlling the illuminance of a target light control zone in consideration of the user's leaving according to the flowchart illustrated in FIG. 22 in operation 2116. Upon sensing that the electronic device has entered the configured area, the controller may perform a second subroutine for controlling the illuminance of a target light control zone in consideration of the user's entry according to the flowchart illustrated in FIG. 22 in operation 2118.

FIG. 22 is a flowchart illustrating an example subroutine for light control in the case of a user leaving in the flowchart of FIG. 21.

Referring to FIG. 22, if the light control zone which the electronic device has left includes an overlap zone, the controller determines whether the overlap zone is to be released in operation 2210. The determination may be made by checking whether the overlap zone does not exist any longer due to removal of the light control zone which the electronic device has left. For example, if the overlap zone is formed by two light control zones and one of the light control zones is eliminated, it may be determined that release of the overlap zone is required. However, if the overlap zone is formed by three or more light control zones, even though one of the light control zones is eliminated, it may be determined that release of the overlap zone is not required.

If release of the overlap zone is not required, the controller may turn off all of lights configured for the light control zone which the electronic device (user terminal) has left in operation 2212. On the other hand, if release of the overlap zone is required, the controller may control turn-on and turn-off of lights, and/or the brightness of the turned-on lights in a light control zone of another electronic device (user terminal), which may be affect in illuminance in operation 2214. This may prevent and/or reduce the loss of the overlap zone from impairing the visual comport achieved through light control in consideration of the overlap zone.

Figure 23:
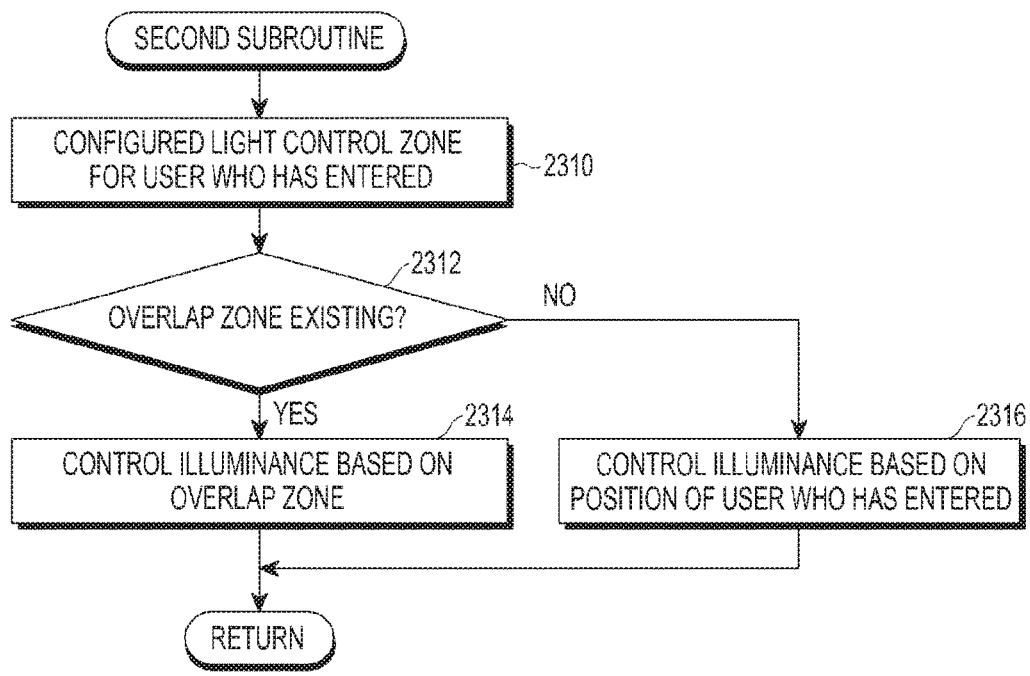
FIG. 23 is a flowchart illustrating an example subroutine for light control when the user enters the zone in the flowchart of FIG. 21.

FIG. 23 is a flowchart illustrating an example subroutine for light control in the case of a user's entry in the flowchart of FIG. 21.

Referring to FIG. 23, the controller may configure a light control zone for a new electronic device (user terminal) in operation 2310. The controller determines whether there is an overlap zone in the configured light control zone in operation 2312.

In the presence of an overlap zone, the controller may perform illuminance control for a user of the new electronic device based on the overlap zone in operation 2314. For example, at least one light of the overlap zone may first be turned on, and lights may be turned on in order of proximity to the overlap zone until a target illuminance is acquired at the position (reference point) of the electronic device.

In the absence of an overlap zone, the controller may perform light control for the user of the new electronic device based on the position (reference point) of the new electronic device in operation 2316. For example, lights may be turned on in order of proximity to the reference point until the target illuminance is acquired at the position (reference point) of the electronic device.

Figure 24:
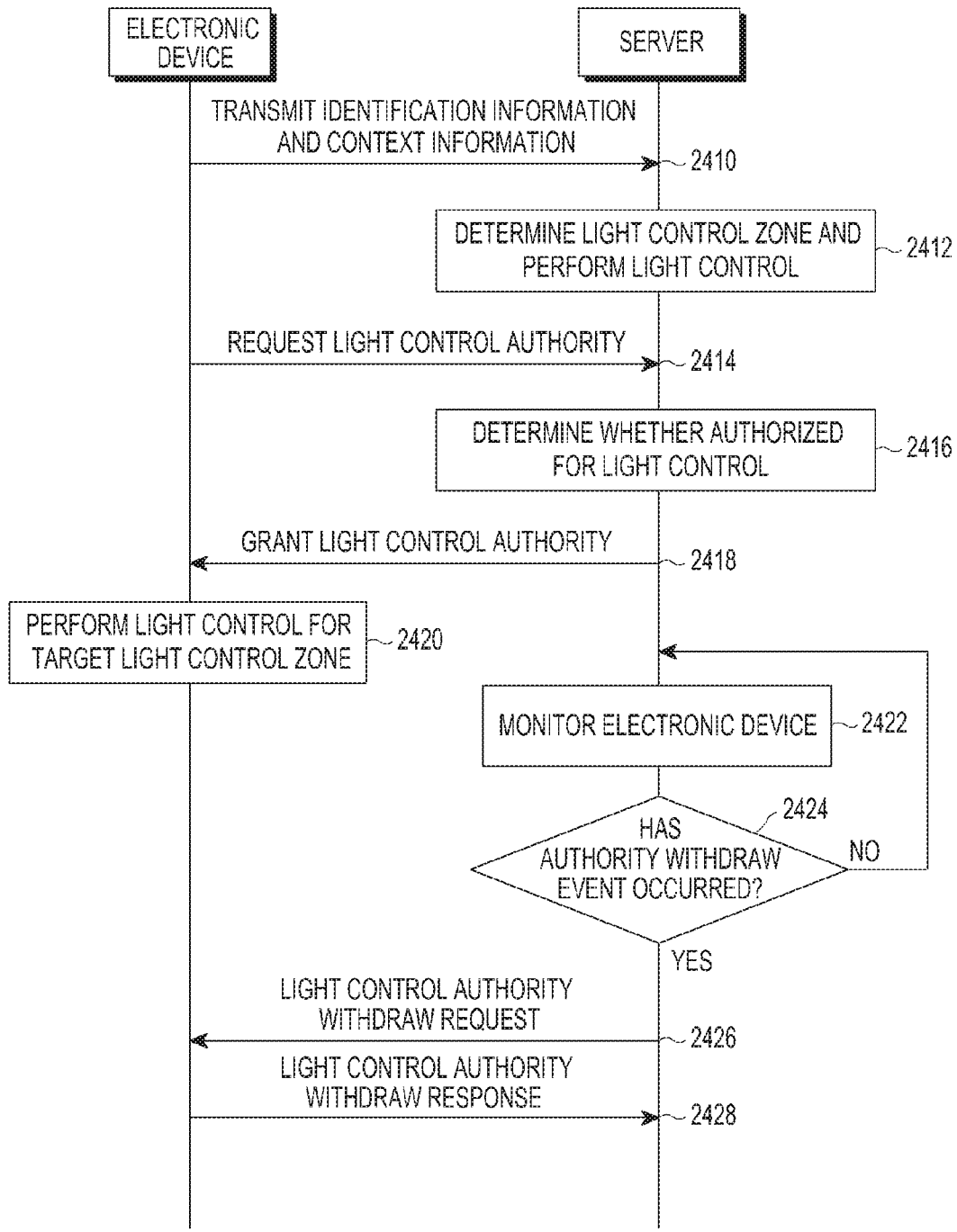
FIG. 24 is a diagram illustrating an example signaling procedure for supporting light control in an electronic device according to various example embodiments of the present disclosure.

FIG. 24 is a diagram illustrating an example signaling procedure for supporting light control in an electronic device according to various example embodiments of the present disclosure.

Referring to FIG. 24, an electronic device corresponding to a user terminal or the like may provide position information about the electronic device to a server, so that the server may control a light of a light control zone configured for the electronic device. The electronic device may request a light control authority for a light control zone (a target light control zone) in which or around which the electronic device is located to the server. Upon acquisition of the light control authority from the server, the electronic device may perform light control for the target light control zone. For example, the light control for the target light control zone may include direct control of the brightness, color temperature, steering angle, or the like of at least one of lights included in the target light control zone.

For example, the electronic device may periodically or aperiodically provide identification information and context information to the server in operation 2410. For example, the periodic providing may be to provide identification information and context information at preset transmission time points, whereas the aperiodic providing may be to provide identification information and context information at an unpredicted time such as a time of reception of a request from the server. The identification information and the context information have been defined before, and thus will not be described herein.

Upon receipt of the identification information and the context information from the electronic device, the server may determine a light control zone for the electronic device based on the received identification information and context information, and control lights of the determined light control zone to provide a lighting environment satisfying a visual comfort condition in operation 2412. For example, the light control may be control of turn-on or off, brightness, color temperature, steering angle, or the like of a target light. The server may comprehensively consider natural light, influence of a surrounding light, the presence or absence of an overlap zone, and so on in the light control for the target light control zone.

The electronic device may determine whether light control of the target light control zone is needed and request the server to grant a light control authority based on the determination in operation 2414. The electronic device may determine whether to request the light control authority depending on whether an event triggering direct light control of the target light control zone has occurred. For example, upon sensing occurrence of an emergency to a user based on health state information measured from the user and an emergency recognition condition, the electronic device may request the light control authority to the server, for light control to notify the emergency. Further, the light control authority may be granted to each user in a home, and each user may control a desired light according to the user's tastes within a range that does not cause collision between users. To support many other scenarios, the electronic device may acquire the light control authority, and directly control a target light with the light control authority.

Upon receipt of the light control authority request from the electronic device, the server may perform an examination regarding granting of the light control authority to the electronic device, and determine whether to grant the light control authority to the electronic device based on the examination in operation 2416. For example, the server may grant the light control authority to the electronic device in comprehensive consideration of a priority level assigned to the electronic device, the importance of the event triggering the request of the light control authority, and the usage of a space in which the target light control zone has been configured.

If determining to grant the light control authority to the electronic device, the server may grant the light control authority to the electronic device in operation 2418. For example, when granting the light control authority to the electronic device, the server may provide identification information about at least one light control zone for which the electronic device is authorized to perform light control. When granting the light control authority to the electronic device, the server may further provide information about a period during which the electronic device is authorized to perform light control. For example, the period may be a time period (for example, 17:00 to 20:00) during which the electronic device is authorized to perform direct light control.

If the electronic device acquires the light control authority from the server, the electronic device may directly perform light control for at least one light control zone in operation 2420. For example, the electronic device may establish direct communication with the light controller that may control the lights of the at least one light control zone, and set or change turn-on or turn-off, a brightness, a color temperature, a steering angle, or the like of a target light by direct communication with the light controller. For this purpose, the electronic device may provide a UI that enables the user to efficiently use light control.

In another example, the electronic device may establish direct communication with the light controller that may control the lights of the at least one light control zone, and set or change turn-on or off, brightness, color temperature, steering angle, or the like of a target light by direct communication with the light controller. For this purpose, the electronic device may check occurrence of a light control situation according to a set condition (a visual comfort condition or an emergency notification condition). Upon occurrence of the light control situation, the electronic device may perform light control for the target light control zone even through it does not receive a user command.

After granting the light control authority to the electronic device, the server may continuously monitor the state of the electronic device in operation 2422. For example, the server may continuously monitor movement of the electronic device and monitor whether the electronic device has left the light control zone for which the electronic device is authorized to perform light control based on the monitoring. This may support efficient withdrawal of the light control authority granted to the electronic device.

The server may sense occurrence of an event triggering withdrawal of the light control authority granted to the electronic device, based on information collected through monitoring of the electronic device in operation 2424. For example, if the electronic device has left the light control zone for which the electronic device is authorized to perform light control or the state of the user of the electronic device has changed (for example, sleep), the server may determine that an event triggering the withdrawal of the light control authority has occurred. Besides, the authority withdrawal event may occur by a request for returning the light control authority from the electronic device.

Upon occurrence of the authority withdrawal event, the server may request the withdrawal of the light control authority to the electronic device in operation 2426. For example, if the server has granted a light control authority for a plurality of light control zones to the electronic device, the server may request withdrawal of the light control authority for all or part of the light control zones to the electronic device. For this purpose, the server may provide the electronic device with identification information about at least one light control zone for which the light control authority is to be withdrawn from the electronic device.

Upon receipt of the request for withdrawing the light control authority from the server, the electronic device may end the light control which the electronic device is authorized to perform, and transmits a response regarding withdrawal of the light control authority to the server in operation 2428. Upon receipt of a request for withdrawing the light control authority for a part of a plurality of light control zones for which the electronic device is authorized to perform light control, the electronic device may transmit a response indicating that the light control authority will be returned for the requested light control zones to the server. In this case, the electronic device may keep the light control authority for the remaining light control zones. That is, the electronic device may continue light control for the remaining light control zones for which the electronic device has not returned the light control authority.

Figure 25:
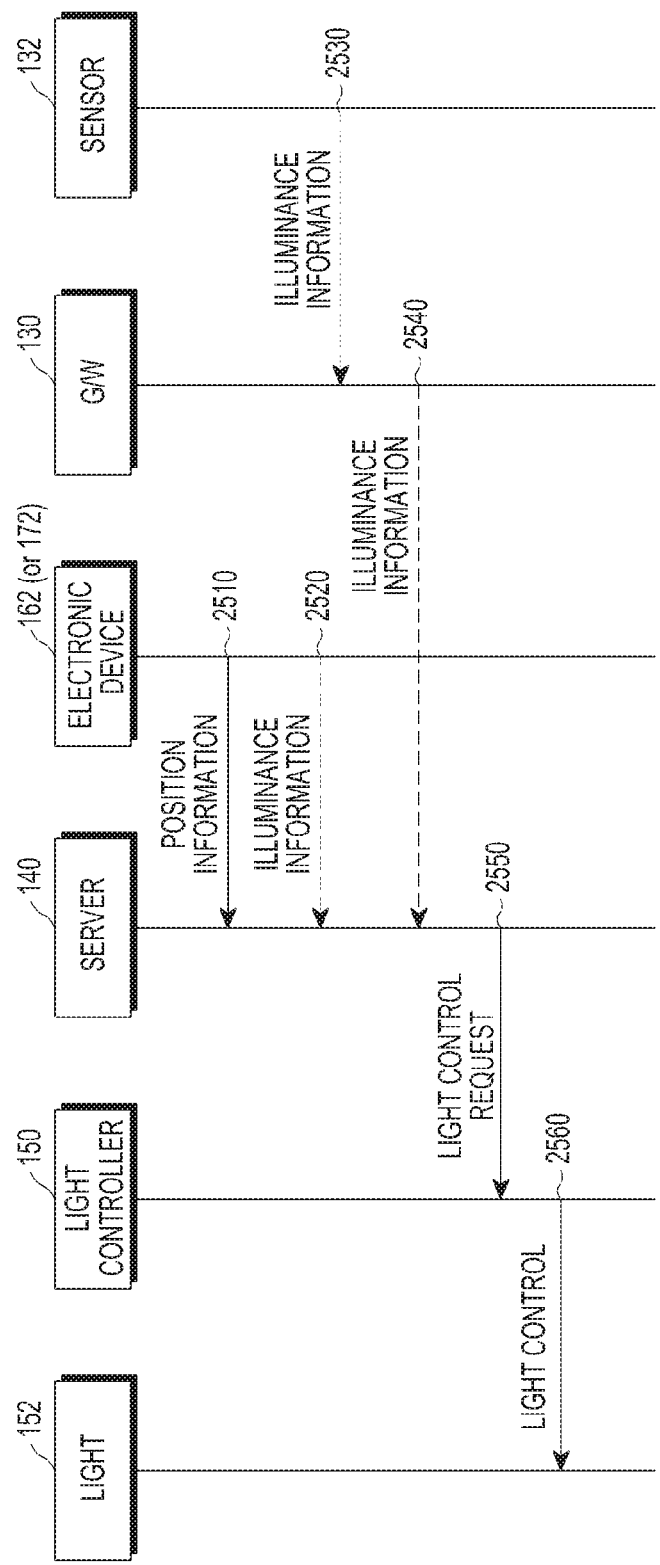
FIG. 25 is a diagram illustrating an example signaling procedure performed upon request of light control from a server based on illuminance information received from external devices (for example, an electronic device and a sensor) according to various example embodiments of the present disclosure.

FIG. 25 is a diagram illustrating an example signaling procedure performed upon request of light control from a server based on illuminance information received from external devices (for example, an electronic device and a sensor) according to various example embodiments of the present disclosure.

Referring to FIG. 25, the electronic device 162 (or 172) may report position information to the server 140 in operation 2510. The electronic device 162 (or 172) may acquire self-position information in one of the afore-proposed various methods.

The server 140 may receive a report of illuminance information from the electronic device 162 (or 172) or the gateway (G/W) 130 in operations 2520 and 2540. The illuminance information may be a value representing the level of brightness at a specific position. For example, a sensor 132 may provide illuminance information to a corresponding gateway 13 in operation 2530.

According to an embodiment, the electronic device 162 (or 172) may measure an illuminance at the position of the electronic device 162 (or 172) and report illuminance information based on the measurement to the server 140 in operation 2520. For example, the electronic device 162 (or 172) may measure an illuminance at the current position by means of an illumination sensor mounted in the electronic device 162 (or 172), and report illumination information based on the measured illuminance to the server 140 in operation 2520. How an illuminance is measured has been described before and thus will not be described herein.

The server 140 may configure at least one light control zone in a light control space based on the position information about the user reported by the electronic device 162 (or 172), and the illuminance information reported by the electronic device 162 (or 172) or the G/W 130 or illuminance information predicted or estimated through an illuminance calculation function, and perform light control to provide a target illuminance in the configured at least one light control zone in operations 2550 and 2560. The target illuminance may be an illuminance enough to provide visual comfort. As proposed before, the target illuminance may be a level defined in the European Standard for Light and Lighting-Lighting of Work Places-Part 1: Indoor Work Places, EN 12464-1, or the American National Standard Practice for Office Lighting, ANSI/IESNA RP-1-04. EN 12464-1 and ANSI/IESNA RP-1-04 in order to provide a visually comfortable illuminance.

The server 140 may further collect context information to configure a light control zone and control lights. The context information may include, for example, information about the presence or absence of a user, density information, flow of movement information, activity information, emotional state information, weather/environment information, abnormal (breakage) state information, user gaze information, and so on. The definitions of various pieces of information that may be included in the context information and how the information is achieved have been described before.

The server 140 may configure a light control zone corresponding to an arbitrary position, with a minimum number of lights with which to acquire a target illuminance at the arbitrary position. When configuring the light control zone, the server 140 may consider the brightness, light color, color temperature, steering angle, focused area, and so on of each of lights to be configured as the light control zone.

If the server 140 configures a light control zone corresponding to each of a plurality of positions, the server 140 may configure at least one overlap zone due to the plurality of light control zones. The overlap zone may be configured with at least one light commonly included in at least two light control zones.

The server 140 may prepare various scenarios for light control on a space segment basis and perform light control according to the scenarios.

For example, upon receipt of a report of a monitored health abnormality from the electronic device 162 (or 172) in a hospital room, the server 140 may control turn-off of all or a part of lights included in at least one light control zone determined based on the position of the electronic device 162 (or 172).

For example, upon receipt of a report of occurrence of an accident from the electronic device 162 (or 172) on a road, the server 140 may control turn-off of all or a part of lights included in at least one light control zone determined based on the position of the electronic device 162 (or 172). In this case, the electronic device 162 (or 172) may be a smart key, an in-vehicle-infotainment (IVI) system, or the like.

For example, upon receipt of a report of a health abnormality or an emergency from the electronic device 162 (or 172) in a swimming pool, the server 140 may control focusing of all or a part of lights included in at least one light control zone determined based on the position of the electronic device 162 (or 172) onto a corresponding position (the position of the user). In this case, the electronic device 162 (or 172) may be a wearable device such as a swimming goggle, a bracelet, a band, a swim suit, or a suit.

For example, the server 140 may monitor use or non-use of a table in a restaurant, and provide differential lighting to an occupied table and an empty table based on the monitoring. That is, the server 140 may control a light for an occupied table so that an appropriate illuminance may be provided for eating or the like, and provide a spot light to an empty table so that the empty table may be easily perceived.

For the above light control, the server 140 may individually or compositely control the brightness levels, light colors, color temperatures, steering angles (steering directions), focused area sizes, and so on of lights in a corresponding light control zone. For this purpose, lights providing various types of light sources (LED, incandescent light, fluorescent light, OLED, laser, EL, and so on) may be installed in a light control zone. The lights may be installed, attached, or positioned in the light control zone in various manners. For example, a light may be embedded into a ceiling or a floor, attached onto a wall or the ceiling, or placed on a table or the floor.

The server 140 may, for example, collect user preference information, and perform light control so as to provide user-preferred lighting based on the collected user preference information. For example, the user preference information may include preferred time zone information, preferred content information, preferred product/food information, preferred event information, preferred weather/environment information, preferred atmosphere information, and so on.

The preferred time zone information may specify, for example, working hours, a break time, and a closing time in an office, or a preferred rising time and a preferred bed time in a home or hotel. The preferred content information may specify preferred TV program content in a home or hotel. The preferred product/food information may specify a preferred product displayed in a retailer/mall. The preferred event information may specify a supported team, a score, winning, and so on in a stadium. The preferred weather/environment information may specify a preferred weather (fine, cloudy, rainy, or mist), a preferred air quality (a fine dust level, and air cleanliness). The preferred atmosphere information may indicate gorgeous, bright, gentle, warm, pleasant, or the like.

Figure 26A:
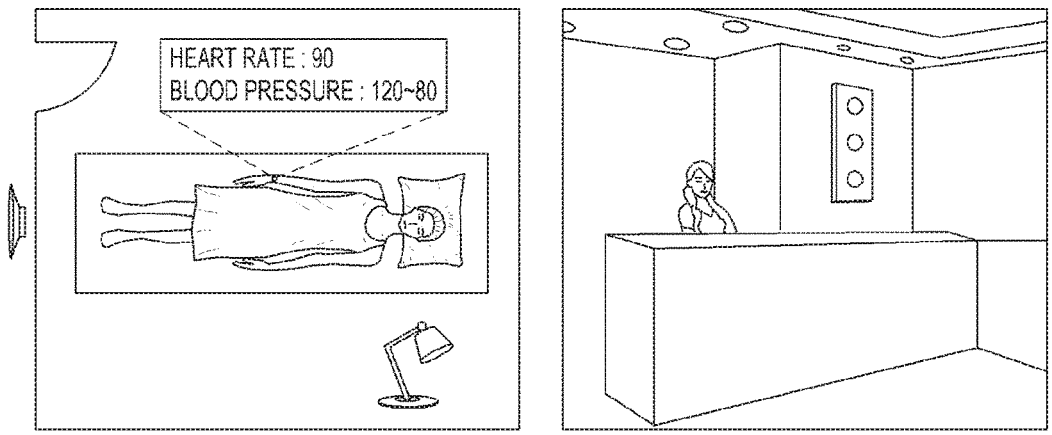
FIGS. 26A, 26B and 26C are diagrams illustrating an example scenario for light control according to an example embodiment of the present disclosure.
Figure 26B:
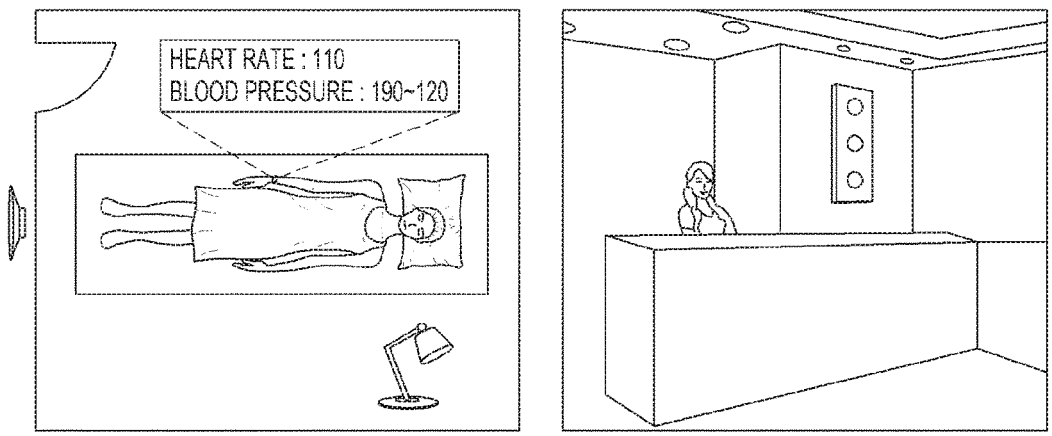
Figure 26C:
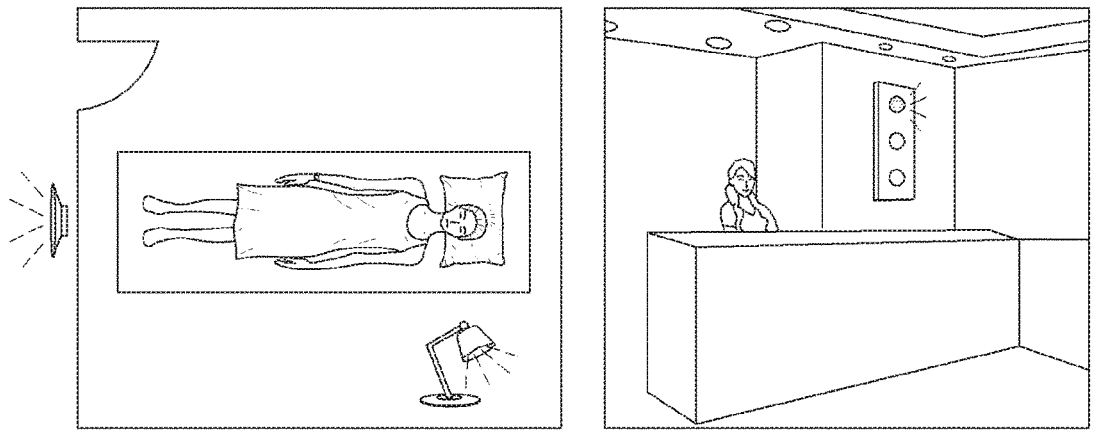

FIGS. 26A, 26B and 26C are diagrams illustrating an example a scenario for light control according to an example embodiment of the present disclosure.

FIG. 26A illustrates a state in which a patient lies on a bed in a hospital room. It is noted that a heart rate and a blood pressure displayed on an electronic device worn around a wrist of the patient are inside normal ranges. If the heart rate and blood pressure displayed on the electronic device worn around the wrist of the patient reach abnormal levels as in FIG. 26B, the electronic device may control lights which the electronic device is authorized to control as illustrated in FIG. 26C. For example, the electronic device may control turn-on or flickering of the target lights.

Figure 27A:
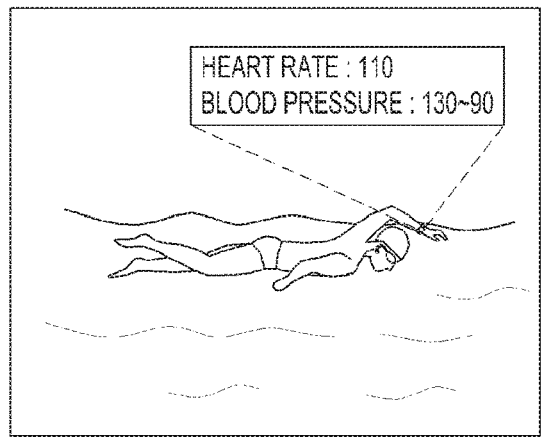
FIGS. 27A, 27B and 27C are diagrams illustrating another example scenario for light control according to an example embodiment of the present disclosure.
Figure 27B:
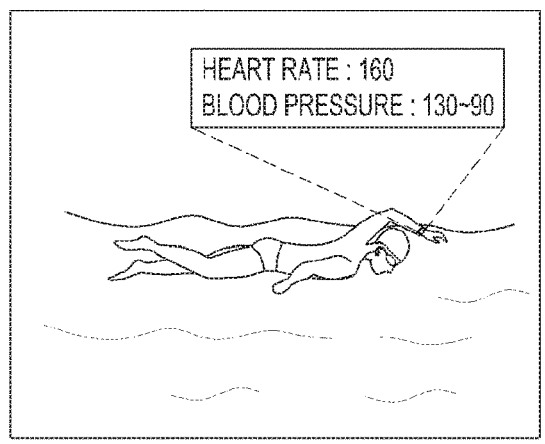
Figure 27C:
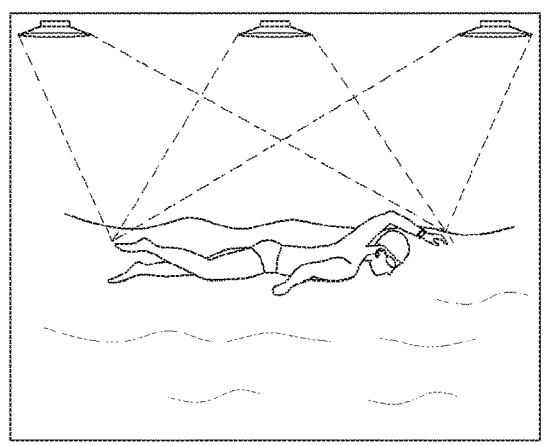

FIGS. 27A, 27B and 27C are diagrams illustrating another example scenario for light control according to an example embodiment of the present disclosure.

FIG. 27A indicates a state in which a user is swimming. It is noted that considering the activity of the user, a heart rate and a blood pressure displayed on an electronic device worn around a wrist of the user are inside normal ranges. If the heart rate displayed on the electronic device worn around the wrist of the user reach abnormal levels as illustrated in FIG. 27B, the electronic device may control lights which the electronic device is authorized to control as illustrated in FIG. 27C. For example, the electronic device may control focusing of the target lights.

Figure 28A:
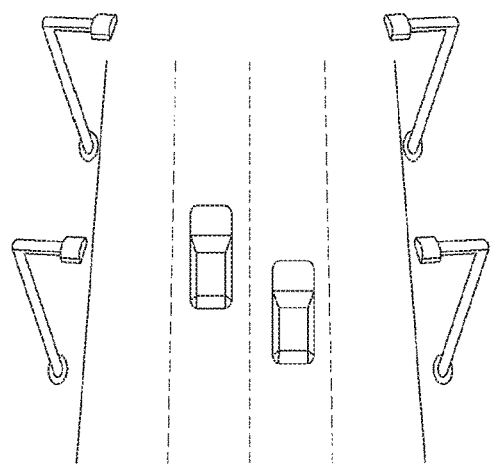
FIGS. 28A, 28B and 28C are diagrams illustrating another example scenario for light control according to an example embodiment of the present disclosure.
Figure 28B:
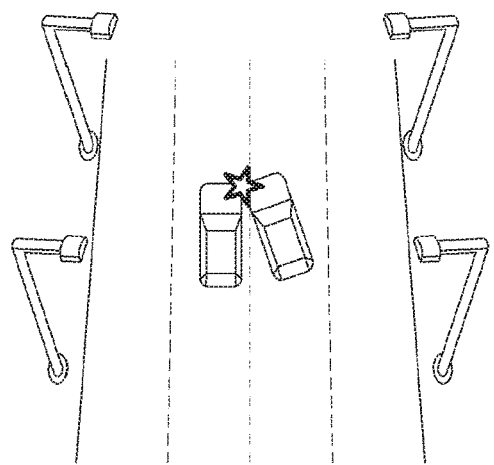
Figure 28C:
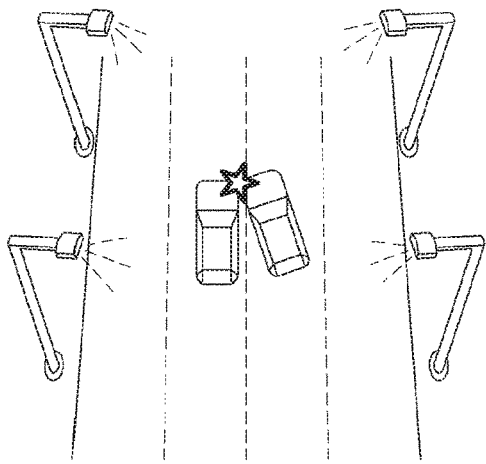

FIGS. 28A, 28B and 28C are diagrams illustrating another example scenario for light control according to an example embodiment of the present disclosure.

FIG. 28A indicates a state in which a driver is driving a vehicle on a road, and an electronic device carried with the driver may display a normal operation state. FIG. 28B indicates that a minor collision occurs between the vehicle and another vehicle on the road. The driver may input occurrence of an accident by manipulating the electronic device. In another example, the electronic device may recognize occurrence of the accident based on information collected from a sensor attached to the vehicle or a sensor mounted inside the vehicle. The electronic device may control lights which the electronic device is authorized to control as illustrated in FIG. 28C. For example, the electronic device may control turn-on or flickering of at least one street lamp installed on the road. Further, to indicate occurrence of the emergency, the electronic device may control flickering of an emergency lamp provided to the vehicle.

As is apparent from the foregoing description of various example embodiments of the present disclosure, a specific light control zone may be configured in a single open space, and light control is performed for the configured light control zone. Therefore, visual comfort can be provided to a user, and energy can be saved as well.

While the disclosure has been illustrated and described with reference to various example embodiments thereof, it will be understood by those skilled in the art that various changes in form and details may be made therein without departing from the spirit and scope of the disclosure as defined by the appended claims and their equivalents.

What is claimed is:

1. An electronic device configured to provide light control, the electronic device comprising:
a sensor unit including at least one sensor;
a communication unit comprising communication circuitry configured to transmit, to a server, a request message including identification information and context information, to receive a response message from the server in response to the request message, and to transmit a light control command message to a light controller; and
a controller configured to generate the context information based on a sensed result through the sensor unit, and to generate the light control command message to satisfy a visual comfort condition based on light control zone information included in the response message,
wherein the light control zone information corresponds to the identification information and the context information, the context information includes position information indicating a position of the electronic device, and wherein the identification information is information for identifying the electronic device.

2. The electronic device of claim 1, wherein the controller is configured to generate the position information using a received signal strength indicator (RSSI) of a wireless signal received through the communication unit, and to receive signals related to an angular velocity and an acceleration acquired through a gyro sensor and an accelerometer sensor included in the sensor unit.

3. The electronic device of claim 2, wherein the sensor unit further includes an illumination sensor, the controller is configured to generate the context information to further include illuminance information measured at the position by the illumination sensor, and the electronic device further comprises a storage for storing a visual comfort condition which defines a desired illuminance measured at the position.

4. The electronic device of claim 2, wherein the sensor unit further includes at least one of: a heart rate sensor, a blood flow sensor, a blood pressure sensor, and an oxygen saturation sensor, and the controller is configured to acquire health state information based on a signal measured by at least one of: the heart rate sensor, the blood flow sensor, the blood pressure sensor, and the oxygen saturation sensor, and to generate the context information to further include the acquired health state information, and the electronic device further comprises a storage for storing a visual comfort condition which defines at least one of: at least one target light to be controlled to provide notification of an emergency, and an illuminance of the at least one target light.

5. The electronic device of claim 3, wherein the storage further stores includes a light control zone information, the electronic device further comprising a display configured to display a light control zone based on light control zone information under the control of the controller, and
wherein the light control zone information includes a target control light list including at least one predetermined target light to measure an illuminance used in satisfying the visual comfort condition at the position by the illumination sensor.

6. The electronic device of claim 4, wherein the controller is configured to determine an emergency recognition condition, and upon sensing occurrence of an emergency satisfying the emergency recognition condition, to control the communication unit to transmit a light control command message providing a notification of the recognized emergency to the light controller.

7. The electronic device of claim 5, wherein the target control light list includes a minimum number of lights that enable measurement of an illuminance used in satisfying the visual comfort condition at the position, when lights are turned on and/or brightness of the lights is controlled in order of proximity of the position.

8. The electronic device of claim 7, wherein if the light control zone information includes overlap zone information, the target control light list includes at least one light included in a determined overlap zone, and the minimum number of lights that enable measurement of the illuminance used in satisfying the visual comfort condition at the position, when the at least one light is turned on and/or brightness of the at least one light is controlled, lights are turned on and/or brightness of the lights is controlled in order of proximity to the overlap zone.

9. The electronic device of claim 5, wherein the controller is configured to acquire spatial information corresponding to the position, transmitted by the server through the communication unit, and to control the display to display a space image using the acquired spatial information and to display the light control zone overlappingly on the displayed space image.

10. A server configured to provide light control, the server comprising:
a communication unit comprising communication circuitry configured to receive a request message including identification information and context information from an electronic device, and to transmit a light control command message to a light controller; and
a controller configured to generate light control zone information defining a light control zone to satisfy a visual comfort condition corresponding to the identification information and the context information, and to generate the light control command message using the generated light control zone information,
wherein the context information includes position information indicating a position of the electronic device, and wherein the identification information is information for identifying the electronic device.

11. The server of claim 10, wherein the context information includes illuminance information measured at position,
wherein the server further comprises a storage for storing a visual comfort condition which defines a desired illuminance at the position, and
wherein the controller is configured to receive information about the visual comfort condition from the electronic device through the communication unit.

12. The server of claim 10, wherein the context information further includes health state information,
wherein the server further includes a storage storing a visual comfort condition which defines at least one of: at least one target light to be controlled to provide notification of an emergency, and an illuminance of the at least one target light, and wherein the controller is configured to receive information about the visual comfort condition from the electronic device through the communication unit.

13. The server of claim 11, wherein the controller is configured to generate the light control information for generating a light control zone, to change a size of the light control zone, or to change a state of the light control zone to satisfy a visual comfort condition of the identification information and the context information included in the request message, and
wherein the communication unit is configured to transmit a response message including the light control zone information to the electronic device in response to the request message.

14. The server of claim 11, wherein the storage further includes a light control zone information,
wherein the light control zone information includes a target control light list including at least one target light to measure an illuminance satisfying the visual comfort condition at the position based on the identification information and the context information included in the request message, and
wherein the light control zone information further includes overlap zone information.

15. The server of claim 12, wherein the controller is configured to determine an emergency recognition condition, to sense occurrence of an emergency by checking whether the context information included in the request message satisfies the emergency recognition condition, and to control the communication unit to transmit a light control command message providing a notification of the recognized emergency to the light controller.

16. The server of claim 14, wherein the target control light list is a list including a minimum number of lights that enable measurement of an illuminance satisfying the visual comfort condition at the position, when lights are turned on and/or brightness of the lights is controlled in order of proximity to the position, using the position information.

17. The server of claim 14, further comprising a display configured to display at least one light control zone based on the light control zone information under the control of the controller.

18. The server of claim 11, wherein upon sensing that the electronic device has left the light control zone using the position information, the controller is configured to control the communication unit to transmit a light control command message for controlling a light of the light control zone.

19. The server of claim 17, wherein the controller is configured to display a space image corresponding to a space in which at least one light control zone is configured, and to display the at least one light control zone overlappingly on the displayed space image.

20. The server of claim 14, wherein upon sensing that the electronic device has left the light control zone using the position information, the controller is configured to detect at least one light included in an overlap zone using the overlap zone information, and to control the communication unit to transmit to the light controller a light control command message requesting turn-off of a remaining light except for a light in use for another light control zone, among the at least one light detected from among lights of the light control zone.

* * * * *